(12) United States Patent
Wu et al.

(10) Patent No.: US 10,945,310 B2
(45) Date of Patent: Mar. 9, 2021

(54) METHOD AND DEVICE FOR WIRELESS COMMUNICATION IN UE AND BASE STATION

(71) Applicant: Shanghai Langbo Communication Technology Company Limited, Shanghai (CN)

(72) Inventors: Keying Wu, Shanghai (CN); XiaoBo Zhang, Shanghai (CN)

(73) Assignee: SHANGHAI LANGBO COMMUNICATION TECHNOLOGY COMPANY LIMITED, Shanghai (CN)

( * ) Notice: Subject to any disclaimer, the term of this patent is extended or adjusted under 35 U.S.C. 154(b) by 0 days.

(21) Appl. No.: 16/355,861

(22) Filed: Mar. 18, 2019

(65) Prior Publication Data

US 2019/0364617 A1 Nov. 28, 2019

(30) Foreign Application Priority Data

Mar. 19, 2018 (CN) .......................... 201810224759.6

(51) Int. Cl.
*H04W 24/10* (2009.01)
*H04W 92/10* (2009.01)
*H04W 72/04* (2009.01)
*H04L 5/00* (2006.01)

(52) U.S. Cl.
CPC ............. *H04W 92/10* (2013.01); *H04L 5/005* (2013.01); *H04W 24/10* (2013.01); *H04W 72/046* (2013.01)

(58) Field of Classification Search
CPC ....................................................... H04L 12/28
USPC ......................................................... 370/329
See application file for complete search history.

(56) References Cited

U.S. PATENT DOCUMENTS

| 10,382,115 | B2 * | 8/2019 | Cheng | .................. H04B 7/0695 |
| 2020/0068549 | A1 * | 2/2020 | Kang | ........................ H04L 5/00 |

FOREIGN PATENT DOCUMENTS

WO    WO-2018017163 A1 *   1/2018    ............ H04W 16/28

* cited by examiner

*Primary Examiner* — Dang T Ton
(74) *Attorney, Agent, or Firm* — Maschoff Brennan

(57) ABSTRACT

A method and device for wireless communication in a UE and a base station is disclosed. The UE receives M first-type reference signals respectively in M first-type air interface resources, receives a first wireless signal, and transmits first report information. A first spatial reception parameter is used for reception of the first wireless signal. The measurement of only M1 first-type reference signal(s) of the M first-type reference signals is used to generate the first report information. The selection of the M1 first-type reference signal(s) is associated with the first spatial reception parameter. The disclosure reduces signaling and feedback overhead associated with beam management and channel measurement.

20 Claims, 17 Drawing Sheets

METHOD AND DEVICE FOR WIRELESS COMMUNICATION IN UE AND BASE STATION

CROSS REFERENCE TO RELATED APPLICATION

This application claims the priority benefit of Chinese Patent Application Serial Number 201810224759.6, filed on Mar. 19, 2018, the full disclosure of which is incorporated herein by reference.

BACKGROUND

Technical Field

The present disclosure relates to a method and device in a wireless communication system, and more particularly to a method and device in a wireless communication system for supporting multi-antenna transmission or supporting data transmission over unlicensed spectrum.

Related Art

The application scenarios of future wireless communication systems become more and more diversified. To meet the different performance needs in various application scenarios, the research project on access to unlicensed spectrum under NR (New Radio) was approved at the 75th Plenary Session of Radio Access Network (RAN) of the 3rd Generation Partner Project (3GPP). In the LAA (License Assisted Access) project of the LTE (Long Term Evolution), the base station and the user equipment (UE) need to perform LBT (Listen Before Talk) before transmitting data on the unlicensed spectrum to ensure no interference with the other data that is wirelessly transmitted on the unlicensed spectrum.

Massive MIMO (Multi-Input Multi-Output) is an important technology feature in the NR system. In the massive MIMO system, a narrower beam pointing to a specific direction is formed by beamforming by multiple antennas to improve communication quality.

SUMMARY

Though research, it is discovered that if a transmitting node (such as a base station or a UE) uses a certain beam when performing LBT, the result of the LBT can only reflect the channel occupancy in the direction of this beam, but cannot reflect the channel occupancy in other directions. Based on this phenomenon, the transmission of the transmitting node in the burst corresponding to this LBT will be limited within the coverage of the beam used for performing LBT. Correspondingly, measurements and feedback on beam management and channel state information will also be limited to the coverage of the beam used for performing LBT. This limitation can be used to reduce the overhead for beam management and channel state information measurement/feedback in each burst.

In view of the above findings, the present disclosure discloses a solution. It should be noted that, in the case of no conflict, the embodiments and the features of the embodiments in the user equipment of the present disclosure can be applied to the base station, and vice versa. In the case of no conflict, the embodiments and the features of the embodiments of the present disclosure may be combined with each other arbitrarily.

A method for wireless communication of a user equipment is disclosure. The method comprises:
  receiving M first-type reference signals respectively in M first-type air interface resources;
  receiving a first wireless signal; and
  transmitting first report information;
  wherein a first spatial reception parameter is used for reception of the first wireless signal; measurement of only M1 first-type reference signal(s) of the M first-type reference signals is used to generate the first report information; selection of the M1 first-type reference signal(s) is associated with the first spatial reception parameter; M is a positive integer greater than 1, and M1 is a positive integer less than M.

In one embodiment, the problem to be solved by the present disclosure is as follows. When the transmitting/receiving beam of the base station needs to be limited within a specific range, for example, within an unlicensed spectrum, the base station's beam would be limited within the coverage for the beam used by LBT. How to use this limitation to reduce the overhead associated with beam management and channel state information measurement/feedback is the problem to be solved by the present disclosure. This problem is solved by the above method by associating the selection of the M1 first-type reference signal(s) with the first spatial reception parameter.

In one embodiment, the characteristics of the method for wireless communication of a user equipment is that according to the first spatial reception parameter, only the transmission beam(s) of the M1 first-type reference signal(s) within the M first-type reference signals would be used in the current burst, and therefore the first report information is required to include the measurement of only the M1 first-type reference signal(s).

In one embodiment, the method for wireless communication of a user equipment is advantageous in that the first receiving spatial parameter is used to implicitly indicate the M1 first-type reference signal(s) from the M first-type reference signals, thereby saving downlink signaling overhead.

In one embodiment, the method for wireless communication of a user equipment is advantageous in that the first report information only needs to include the measurement of the M1 first-type reference signal(s), thereby saving feedback overhead.

In one embodiment, the method for wireless communication of a user equipment further comprises:
  receiving first information;
  wherein the first information indicates a first antenna port group; a transmitting antenna port of the first wireless signal is associated with the first antenna port group; a transmitting antenna port of each of the M1 first-type reference signal(s) is associated with the first antenna port group; the first antenna port group comprises a positive integer number of antenna port(s).

In one embodiment, the foregoing method is advantageous in that the first antenna port group is used to implicitly indicate the M1 first-type reference signal(s) from the M first-type reference signals, thereby saving downlink signaling overhead.

In one embodiment, the method for wireless communication of a user equipment further comprises:
  receiving a second signaling;
  wherein the second signaling comprises scheduling information of the first wireless signal.

In one embodiment, the method for wireless communication of a user equipment further comprises:

receiving a first signaling;

wherein the first signaling indicates a first information unit, the first information unit comprises a first field; the first field of the first information unit is used to determine the M first-type air interface resources.

In one embodiment, the first information unit further comprises a second field; the second field of the first information unit is used to determine a content of the first report information.

In one embodiment, the first information unit further comprises a third field; the third field of the first information unit indicates that the first report information is associated with M1 first-type air interface resource(s); the M1 first-type air interface resource(s) is(are) first-type air interface resource(s) of the M first-type air interface resources that respectively correspond(s) to the M1 first-type reference signal(s).

In one embodiment, the first information unit further comprises a fourth field; the fourth field of the first information unit indicates a first index, the first index being used to trigger transmission of the first report information.

In one embodiment, the method for wireless communication of a user equipment further comprises:

receiving a third signaling;

wherein the third signaling is used to trigger transmission of the first report information.

A method for wireless communication of a base station is disclosure. The method comprises:

transmitting M first-type reference signals respectively in M first-type air interface resources;

transmitting a first wireless signal; and receiving first report information;

wherein a first spatial reception parameter is used for reception of the first wireless signal; measurement of only M1 first-type reference signal(s) of the M first-type reference signals is used to generate the first report information; selection of the M1 first-type reference signal(s) is associated with the first spatial reception parameter; M is a positive integer greater than 1, and M1 is a positive integer less than M.

In one embodiment, the method for wireless communication of a base station further comprises:

transmitting first information;

wherein the first information indicates a first antenna port group; a transmitting antenna port of the first wireless signal is associated with the first antenna port group; a transmitting antenna port of each of the M1 first-type reference signal(s) is associated with the first antenna port group; the first antenna port group comprises a positive integer number of antenna port(s).

In one embodiment, the method for wireless communication of a base station further comprises:

transmitting a second signaling;

wherein the second signaling comprises scheduling information of the first wireless signal.

In one embodiment, the method for wireless communication of a base station further comprises:

transmitting a first signaling;

wherein the first signaling indicates a first information unit, the first information unit comprises a first field; the first field of the first information unit is used to determine the M first-type air interface resources.

In one embodiment, the first information unit further comprises a second field; the second field of the first information unit is used to determine a content of the first report information.

In one embodiment, the first information unit further comprises a third field; the third field of the first information unit indicates that the first report information is associated with M1 first-type air interface resource(s); the M1 first-type air interface resource(s) is(are) first-type air interface resource(s) of the M first-type air interface resources that respectively correspond(s) to the M1 first-type reference signal(s).

In one embodiment, the first information unit further comprises a fourth field; the fourth field of the first information unit indicates a first index, the first index being used to trigger transmission of the first report information.

In one embodiment, the method for wireless communication of a base station further comprises:

transmitting a third signaling;

wherein the third signaling is used to trigger transmission of the first report information.

A user equipment for wireless communication is disclosure. The user equipment comprises:

a first receiver, receiving M first-type reference signals respectively in M first-type air interface resources;

a second receiver, receiving a first wireless signal; and a first transmitter, transmitting first report information;

wherein a first spatial reception parameter is used for reception of the first wireless signal; measurement of only M1 first-type reference signal(s) of the M first-type reference signals is used to generate the first report information; selection of the M1 first-type reference signal(s) is associated with the first spatial reception parameter; M is a positive integer greater than 1, and M1 is a positive integer less than M.

In one embodiment for the user equipment for wireless communication, the second receiver further receives first information, wherein the first information indicates a first antenna port group; a transmitting antenna port of the first wireless signal is associated with the first antenna port group; a transmitting antenna port of each of the M1 first-type reference signal(s) is associated with the first antenna port group; the first antenna port group comprises a positive integer number of antenna port(s).

In one embodiment for the user equipment for wireless communication, the second receiver receives a second signaling; wherein the second signaling comprises scheduling information of the first wireless signal.

In one embodiment for the user equipment for wireless communication, the second receiver receives a first signaling, wherein the first signaling indicates a first information unit, the first information unit comprises a first field; the first field of the first information unit is used to determine the M first-type air interface resources;

In one embodiment for the user equipment for wireless communication, the first information unit comprises a second field; wherein the second field of the first information unit is used to determine a content of the first report information.

In one embodiment for the user equipment for wireless communication, the first information unit comprises a third field; wherein the third field of the first information unit indicates that the first report information is associated with M1 first-type air interface resource(s); the M1 first-type air interface resource(s) is(are) first-type air interface resource(s) of the M first-type air interface resources that respectively correspond(s) to the M1 first-type reference signal(s).

In one embodiment for the user equipment for wireless communication, the first information unit comprises a fourth field; wherein the fourth field of the first information unit indicates a first index, the first index being used to trigger transmission of the first report information.

In one embodiment for the user equipment for wireless communication, the second receiver further receives a third signaling; wherein the third signaling is used to trigger transmission of the first report information.

A base station for wireless communication is disclosure. The base station comprises:

a second transmitter transmitting M first-type reference signals respectively in M first-type air interface resources;
a third transmitter transmitting a first wireless signal; and
a third receiver receiving first report information;

wherein a first spatial reception parameter is used for reception of the first wireless signal; measurement of only M1 first-type reference signal(s) of the M first-type reference signals is used to generate the first report information; selection of the M1 first-type reference signal(s) is associated with the first spatial reception parameter; M is a positive integer greater than 1, and M1 is a positive integer less than M.

In one embodiment for the base station for wireless communication, the third transmitter further transmits first information; wherein the first information indicates a first antenna port group; a transmitting antenna port of the first wireless signal is associated with the first antenna port group; a transmitting antenna port of each of the M1 first-type reference signal(s) is associated with the first antenna port group; the first antenna port group comprises a positive integer number of antenna port(s).

In one embodiment for the base station for wireless communication, the third transmitter further transmits a second signaling; wherein the second signaling comprises scheduling information of the first wireless signal.

In one embodiment for the base station for wireless communication, the third transmitter further transmits a first signaling, wherein the first signaling indicates a first information unit, the first information unit comprises a first field; the first field of the first information unit is used to determine the M first-type air interface resources.

In one embodiment for the base station for wireless communication, the first information unit comprises a second field; wherein the second field of the first information unit is used to determine a content of the first report information.

In one embodiment for the base station for wireless communication, the first information unit comprises a third field; wherein the third field of the first information unit indicates that the first report information is associated with M1 first-type air interface resource(s); the M1 first-type air interface resource(s) is(are) first-type air interface resource(s) of the M first-type air interface resources that respectively correspond(s) to the M1 first-type reference signal(s).

In one embodiment for the base station for wireless communication, the first information unit comprises a fourth field; wherein the fourth field of the first information unit indicates a first index, the first index being used to trigger transmission of the first report information.

In one embodiment for the base station for wireless communication, the third transmitter further transmits a third signaling; wherein the third signaling is used to trigger transmission of the first report information.

In some cases, the transmission/reception beams of the base station over a period of time need to be limited within a specific range. For example, in the unlicensed spectrum, the beam that the base station can use in each burst is limited by the beam used by the LBT corresponding to each burst. The disclosure proposes that in this case, the same trigger state can be used to trigger CSI reporting for reference signals transmitted by different beams, and according to the current beam constraint, the CSI report specific reference signal is implicitly determined. This method reduces the overhead of downlink signaling and the overhead of CSI feedback.

BRIEF DESCRIPTION OF THE DRAWINGS

Other features, objects, and advantages of the present disclosure will become more apparent from the detailed description of the accompanying drawings.

DETAILED DESCRIPTION OF THE EMBODIMENTS

The following description with reference to the accompanying drawings is provided to explain the exemplary embodiments of the disclosure. Note that in the case of no conflict, the embodiments of the present disclosure and the features of the embodiments may be arbitrarily combined with each other.

Embodiment I

Figure 1:
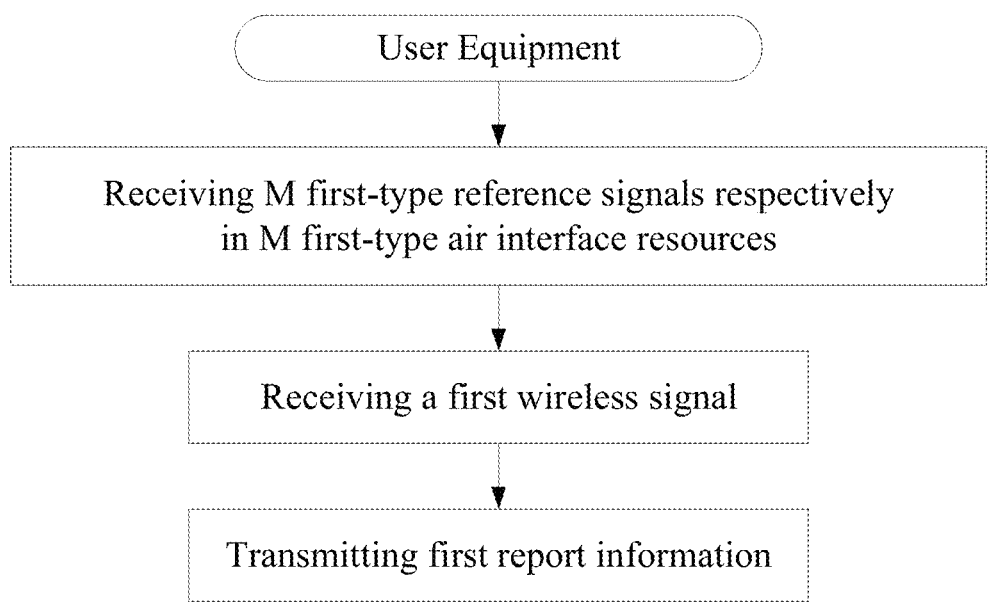
FIG. 1 illustrates a flow chart for M first-type reference signals, a first wireless signal, and first report information according to one embodiment of the present disclosure.

Embodiment I demonstrates a flow chart for M first-type reference signals, a first wireless signal, and first report information, as shown in FIG. 1.

In Embodiment I, the user equipment of the disclosure receives M first-type reference signals respectively in M first-type air interface resources, receives a first wireless signal; and transmits first report information; wherein a first spatial reception parameter is used for reception of the first wireless signal; measurement of only M1 first-type reference signal(s) of the M first-type reference signals is used to generate the first report information; selection of the M1 first-type reference signal(s) is associated with the first spatial reception parameter; M is a positive integer greater than 1, and M1 is a positive integer less than M.

In one embodiment, the M first-type air interface resources are reserved for the M first-type reference signals respectively.

In one embodiment, any of the M first-type air interface resources includes one or more of {time domain resources, frequency domain resources, code domain resources}.

In one embodiment, the M1 is equal to 1.

In one embodiment, the M1 is greater than 1.

In one embodiment, the first wireless signal includes a physical layer signaling.

In one embodiment, the first wireless signal includes a dynamic signaling.

In one embodiment, the first wireless signal includes downlink data.

In one embodiment, the first report information is associated with the M1 first-type reference signal(s).

In one embodiment, the first report information includes UCI (Uplink control information).

In one embodiment, the first report information includes CSI (Channel State Information).

In one embodiment, the first report information includes one or more of CRI (Channel-state information reference signals Resource Indicator), RI (Rank Indicator), PMI (Precoding Matrix Indicator), RSRP (Reference Signal Received Power), RSRQ (Reference Signal Received Quality), and CQI (Channel Quality Indicator).

In one embodiment, the phrase that measurement of only M1 first-type reference signal(s) of the M first-type reference signals is used to generate the first report information refers to that the first report information is irrelevant to first-type reference signal(s) of the M first-type reference signals other than the M1 first-type reference signal(s).

In one embodiment, the measurement of the M1 first-type reference signal(s) is used to generate UCI included in the first report information.

In one embodiment, the measurement of the M1 first-type reference signal(s) is used to generate CSI included in the first report information.

In one embodiment, the UCI included in the first report information is irrelevant to first-type reference signal(s) of the M first-type reference signals other than the M1 first-type reference signal(s).

In one embodiment, the CSI included in the first report information is irrelevant to first-type reference signal(s) of the M first-type reference signals other than the M1 first-type reference signal(s).

In one embodiment, the measurement of the M1 first-type reference signal(s) is used to determine a first measurement value; the first measurement value is used to determine the first report information.

In one sub-embodiment of the above embodiment, the first measurement value includes one or more of RI, CRI, RSRP, RSPQ, PMI, and CQI.

In one sub-embodiment of the above embodiment, the first report information includes the quantitative value of the first measurement value.

In one embodiment, at least one of the M1 first-type reference signal(s) is used for channel measurement.

In one embodiment, at least one of the M1 first-type reference signal(s) is used for interference measurement.

In one embodiment, the first spatial reception parameter is Spatial Rx parameters.

In one embodiment, the first spatial reception parameter is Spatial Rx parameters in 3GPP TS38.214.

In one embodiment, the first spatial reception parameter is Spatial Rx parameters in 3GPP TS38.214(V15.0.0).

In one embodiment, the first spatial reception parameter includes one or more of reception beam, reception analog beamforming matrix, reception analog beamforming vector, reception spatial filter, and spatial domain reception filter.

In one embodiment, the phrase that a first spatial reception parameter is used for reception of the first wireless signal refers to that the first spatial reception parameter is sued to determine the reception beam for the first wireless signal.

In one embodiment, the phrase that a first spatial reception parameter is used for reception of the first wireless signal refers to that the first spatial reception parameter is used to determine the reception beamforming vector of the first wireless signal.

In one embodiment, the phrase that a first spatial reception parameter is used for reception of the first wireless signal refers to that the first spatial reception parameter is used to determine spatial domain reception filter of the first wireless signal.

In one embodiment, the phrase that selection of the M1 first-type reference signal(s) is associated with the first spatial reception parameter includes that the first spatial reception parameter is used to determine the M1 first-type reference signal(s) from the M first-type reference signals.

In one embodiment, the phrase that selection of the M1 first-type reference signal(s) is associated with the first spatial reception parameter includes that the first spatial reception parameter is associated with first information; the first information is used to determine the M1 first-type reference signal(s) from the M first-type reference signals; the first information is assigned by a base station.

In one embodiment, the M1 first-type reference signal(s) is(are) associated to the first spatial reception parameter.

In one embodiment, the first spatial reception parameter is used for reception of the M1 first-type reference signal(s).

In one embodiment, the M1 first-type reference signal(s) is(are) composed of all of the M first-type reference signals that are associated with the first spatial reception parameter.

In one embodiment, the M1 first-type reference signal(s) is(are) composed of all of the M first-type reference signals that are received by the first spatial reception parameter.

In one embodiment, the first report information is transmitted on a frequency band deployed on an unlicensed spectrum.

In one embodiment, the first report information is transmitted on a frequency band deployed on a licensed spectrum.

In one embodiment, any one of the M first-type reference signals is transmitted on a frequency band deployed on an unlicensed spectrum.

In one embodiment, at least one of the M first-type reference signals is transmitted on a frequency band deployed on an unlicensed spectrum.

Embodiment II

Figure 2:
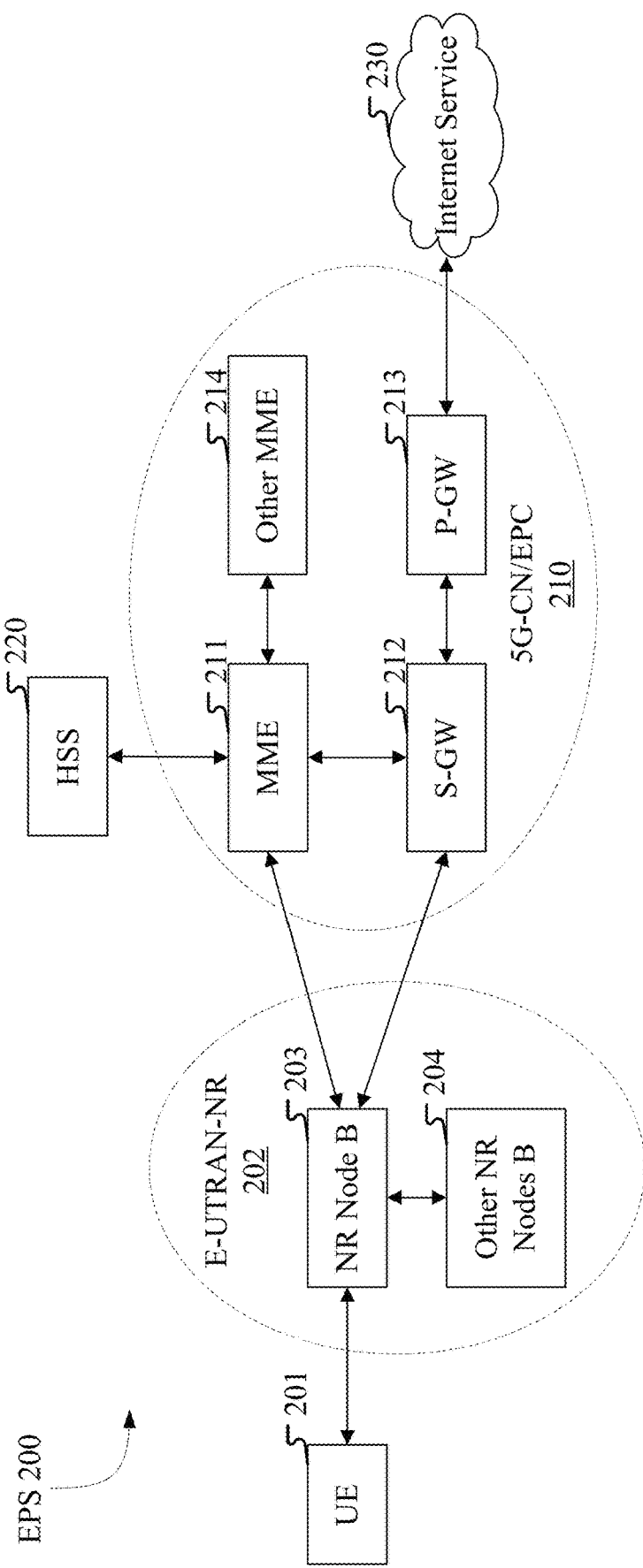
FIG. 2 illustrates a schematic diagram of the network architecture according to one embodiment of the present disclosure.

Embodiment II demonstrates a schematic diagram of the network architecture, as shown in FIG. 2.

FIG. 2 illustrates a network architecture 200 of LTE (Long-Term Evolution), LTE-A (Long-Term Evolution Advanced), and NR 5G systems. The NR 5G, LTE-A or LTE network architecture 200 may be called an Evolved Packet System (EPS) 200. The EPS 200 may include one or more UEs 201, an E-UTRAN-NR (Evolved Universal Terrestrial Radio Access Network-New RADIO), a 5G-CN (5G-Core Network) 210, Home Subscriber Server (HSS) 220, and an Internet service 230. UMTS corresponds to Universal Mobile Telecommunications System. The EPS 200 may be interconnected with other access networks. For simple description, the entities/interfaces are not shown. As shown in FIG. 2, the EPS provides packet switching services. Those skilled in the art are easy to understand that various concepts presented throughout the disclosure can be extended to networks providing circuit switching services or other cellular networks. The E-UTRAN-NR 202 includes an NR (New Radio) node B (gNB) 203 and other gNBs 204. The gNB 203 provides UE 201 oriented user plane and control plane protocol terminations. The gNB 203 may be connected to other gNBs 204 via an X2 interface (for example, backhaul). The gNB 203 may be called a base station, a base transceiver station, a radio base station, a radio transceiver, a transceiver function, a Basic Service Set (BSS), an Extended Service Set (ESS), a TRP (Transmit Receive Point) or some other appropriate terms. The gNB 203 provides an access point of the 5G-CN/EPC 210 210 for the UE 201. Examples of UE 201 include cellular phones, smart phones, Session Initiation Protocol (SIP) phones, laptop computers, Personal Digital Assistants (PDAs), Satellite Radios, Global Positioning Systems (GPSs), multimedia devices, video devices, digital audio player (for example, MP3 players), cameras, games consoles, unmanned aerial vehicles, air vehicles, narrow-band physical network equipment, machine-type communication equipment, land vehicles, automobiles, wearable equipment, or any other devices having similar functions. Those skilled in the art may also call the UE 201 a mobile station, a subscriber station, a mobile unit, a subscriber unit, a wireless unit, a remote unit, a mobile device, a wireless device, a radio communication device, a remote device, a mobile subscriber station, an access terminal, a mobile terminal, a wireless terminal, a remote terminal, a handset, a user agent, a mobile client, a client or some other appropriate terms. The gNB 203 is connected to the 5G-CN/EPC 210 via an S1 interface. The 5G-CN/EPC 210 includes an MME (Mobility Management Entity) 211, other MMES 214, a Service Gateway (S-GW) 212 and a Packet Data Network Gateway (P-GW) 213. The MME 211 is a control node for processing a signaling between the UE 201 and the 5G-CN/EPC 210. Generally, the MME 211 provides bearer and connection management. All user Internet Protocol (IP) packets are transmitted through the S-GW 212. The S-GW 212 is connected to the P-GW 213. The P-GW 213 provides UE IP address allocation and other functions. The P-GW 213 is connected to the Internet service 230. The Internet service 230 includes IP services corresponding to operators, specifically including internet, intranet, IP Multimedia Subsystems (IP IMSs) and PS Streaming Services (PSSs).

In one embodiment, the gNB 203 corresponds to the base station in the disclosure.

In one embodiment, the UE 201 corresponds to the UE in the disclosure.

In one embodiment, the UE 201 supports multi-antenna transmission.

In one embodiment, the gNB 203 supports multi-antenna transmission.

In one embodiment, the UE 201 supports wireless communication for the data transmission on unlicensed spectrum.

In one embodiment, the gNB203 supports wireless communication for the data transmission on unlicensed spectrum.

Embodiment III

Figure 3:
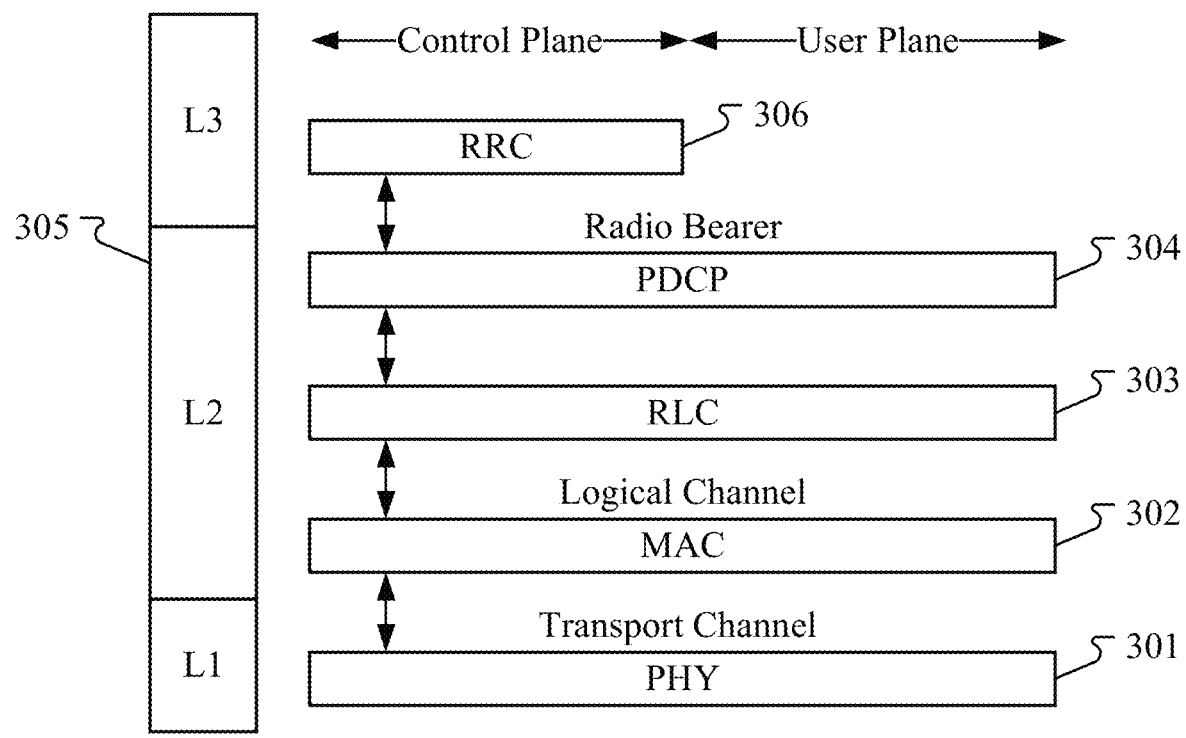
FIG. 3 illustrates a schematic diagram for a radio protocol architecture of a user plane and a control plane according to one embodiment of the disclosure.

Embodiment 3 is a diagram illustrating a radio protocol architecture of a user plane and a control plane according to the disclosure, as shown in FIG. 3.

FIG. 3 is a diagram illustrating an embodiment of a radio protocol architecture of a user plane and a control plane. In FIG. 3, the radio protocol architecture of a UE and a gNB is represented by three layers, which are a Layer 1, a Layer 2 and a Layer 3 respectively. The Layer 1 (L1 layer) 301 is the lowest layer and implements various PHY (physical layer) signal processing functions. The L1 layer will be referred to herein as the PHY 301. The Layer 2 (L2 layer) 305 is above the PHY 301, and is responsible for the link between the UE and the gNB over the PHY 301. In the user plane, the L2 layer 305 includes a Medium Access Control (MAC) sublayer 302, a Radio Link Control (RLC) sublayer 303, and a Packet Data Convergence Protocol (PDCP) sublayer 304, which are terminated at the gNB on the network side. Although not shown in the figure, the UE may include several higher layers above the L2 layer 305, including a network layer (i.e. IP layer) terminated at the P-GW 213 on the network side and an application layer terminated at the other end (i.e. a peer UE, a server, etc.) of the connection. The PDCP sublayer 304 provides multiplexing between different radio bearers and logical channels. The PDCP sublayer 304 also provides header compression for higher-layer packets so as to reduce radio transmission overhead. The PDCP sublayer 304 provides security by encrypting packets and provides support for UE handover between gNBs. The RLC sublayer 303 provides segmentation and reassembling of higher-layer packets, retransmission of lost packets, and reordering of lost packets so as to compensate for out-of-order reception due to HARQ. The MAC sublayer 302 provides multiplexing between logical channels and transport channels. The MAC sublayer 302 is also responsible for allocating various radio resources (i.e., resource blocks) in one cell among UEs. The MAC sublayer 302 is also in charge of HARQ operations. In the control plane, the radio protocol architecture of the UE and the gNB is almost the same as the radio protocol architecture in the user plane on the PHY 301 and the L2 layer 305, with the exception that there is no header compression function for the control plane. The control plane also includes a Radio Resource Control (RRC) sublayer 306 in the layer 3 (L3). The RRC sublayer 306 is responsible for acquiring radio resources (i.e. radio bearers) and configuring lower layers using an RRC signaling between the gNB and the UE.

In one embodiment, the radio protocol architecture shown in FIG. 3 is applicable to the UE in the disclosure.

In one embodiment, the radio protocol architecture shown in FIG. 3 is applicable to the base station in the disclosure.

In one embodiment, the M first-type reference signals in the disclosure is generated by the PHY 301.

In one embodiment, the first wireless signal in the disclosure is generated by the PHY 301.

In one embodiment, the first report information in the disclosure is generated by the PHY 301.

In one embodiment, the first information in the disclosure is generated by the PHY 301.

In one embodiment, the second signaling in the disclosure is generated by the PHY 301.

In one embodiment, the second signaling in the disclosure is generated by the MAC sublayer 302.

In one embodiment, the first signaling in the disclosure is generated by the PHY 301.

In one embodiment, the first signaling in the disclosure is generated by the MAC sublayer 302.

In one embodiment, the first signaling in the disclosure is generated by the RRC sublayer 306.

In one embodiment, the third signaling in the disclosure is generated by the PHY 301.

In one embodiment, the third signaling in the disclosure is generated by the MAC sublayer 302.

Embodiment IV

Figure 4:
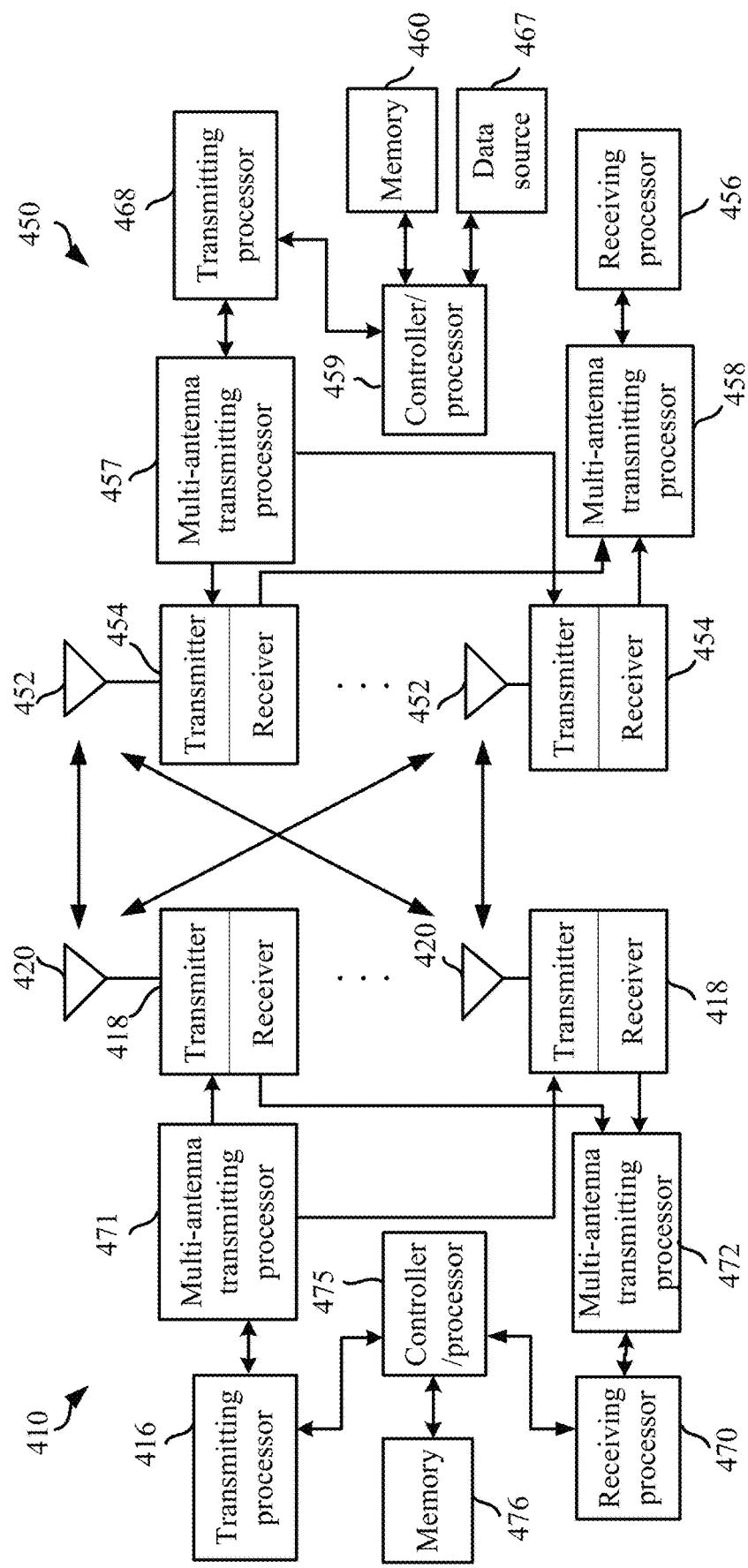
FIG. 4 illustrates a schematic diagram for a NR (New Radio) node and a user equipment (UE) according to one embodiment of the present disclosure.

Embodiment 4 illustrates a diagram of a NR node and a given UE according to the disclosure, as shown in FIG. 4. FIG. 4 is a block diagram of a gNB 410 in communication with a UE 450 in an access network.

The gNB 410 may include a controller/processor 475, a memory 476, a receiving processor 470, a transmitting processor 416, a multi-antenna receiving processor 472, a multi-antenna transmitting processor 471, a transmitter/receiver 418 and an antenna 420.

The UE 450 includes a controller/processor 459, a memory 460, a data source 467, a transmitting processor 468, a receiving processor 456, a multi-antenna transmitting processor 457, a multi-antenna receiving processor 458, a transmitter/receiver 454 and an antenna 452.

In Downlink (DL) transmission, in the gNB 410, the upper layer packets from the core network are provided to controller/processor 475. The controller/processor 475 performs functions of L2 layer. In downlink transmission, the controller/processor 475 provides header compression, encryption, packet segmentation and reordering, multiplexing between a logical channel and a transport channel, and radio resource allocation for the UE 450 based on various priority metrics. The controller/processor 475 is also in charge of HARQ operation, retransmission of lost packets, and signalings to the UE450. The transmitting processor 416 and the multi-antenna transmitting processor 471 perform signal processing functions of L1 layer (that is, PHY). The transmitting processor 416 performs coding and interleaving, so as to facilitate FEC (Forward Error Correction) at the UE 450 side, and mapping of signal clusters based on different modulation schemes (i.e., BPSK, QPSK, M-PSK, M-QAM, etc.). The multi-antenna transmit processor 471 performs digital spatial precoding on the encoded and modulated symbols, including codebook based precoding and non-codebook based precoding, and beamforming to generate one or more spatial streams. The transmitting processor 416 then maps each spatial stream to the subcarrier for multiplexing with reference signals (e.g., pilots) in the time domain and/or frequency domain. Then the inverse fast Fourier transform (IFFT) is then used to generate the physical channel carrying the time-domain multi-carrier symbol stream. The multi-antenna transmit processor 471 then performs the precoding/beamforming for the time-domain multi-carrier symbol stream. Each transmitter 418 converts the baseband multicarrier symbol stream provided by the multi-antenna transmitting processor 471 into a radio frequency stream, which is then provided to the antenna 420.

In Downlink (DL) transmission, in the UE 450, each receiver 454 receives a signal through the respective antenna 452. Each receiver 454 recovers the information modulated onto the radio frequency carrier, and converts the RF stream into a baseband multi-carrier symbol stream which is then provided to the receiving processor 456. The receiving processor 456 and the multi-antenna receiving processor 458 performs various signal processing functions of the L1 layer. The multi-antenna receiving processor 458 performs the reception analog precoding/beamforming operations on the baseband multicarrier symbol streams received from the receiver 454. The receiving processor 456 converts the reception analog precoded/beamformed baseband multicarrier symbol streams from time domain to frequency domain using Fast Fourier Transform (FFT). In the frequency domain, the physical layer data signal and the reference signal are demultiplexed by the receiving processor 456. The reference signal is used for channel estimation. The data signal is recovered as any spatial stream destined for the UE 450 after detection by the multi-antennas in the multi-antenna receiving processor 458. The symbols on each spatial stream are demodulated and recovered in receiving processor 456 and a soft decision is generated. The receiving processor 456 then decodes and deinterleaves the soft decision to recover the upper layer data and control signals transmitted by the gNB 410 on the physical channel. The upper layer data and control signals are then provided to the controller/processor 459. The controller/processor 459 performs functions of L2 layer. The controller/processor 459 may be connected to the memory 460 that stores program codes and data. The memory 460 may be called a computer readable medium. In DL transmission, the controller/processor 459 performs demultiplexing, packet reassembly, decryption, header decompression, and control signal processing between the transmission and logical channels to recover upper layer packets from the core network. The upper layer packet is then provided to all protocol layers above the L2 layer. The various control signals can also be provided to L3 for L3 processing. The controller/processor 459 is also responsible for error detection using an acknowledgement (ACK) and/or negative acknowledgement (NACK) protocol to support HARQ operations.

In Uplink (UL) transmission, in the UE 450, the data source 467 is used to provide the upper layer data packets to controller/processor 459. The data source 467 represents all protocol layers above the L2 layer. Similar to the transmission function at gNB 410 described in the DL transmission, the controller/processor 459 performs header compression, encryption, packet segmentation and reordering, and multiplexing between logical and transmission channels based on the wireless resource allocation of the gNB 410, implementing the L2 layer function for the user plane and the control plane. The controller/processor 459 is also in charge of HARQ operations, retransmission of lost packets, and signalings to the gNB 410. The transmitting processor 468 performs modulation mapping and channel coding processing. The multi-antenna transmit processor 457 performs digital multi-antenna spatial precoding, including codebook based precoding and non-codebook based precoding, and beamforming processing. The transmitting processor 468 then modulates the generated spatial stream into a multi-carrier/single-carrier symbol stream. After an analog precoding/beamforming operation in the multi-antenna transmitting processor 457 is performed, the steam is then provided to the antennas 452 via the transmitter 454. Each transmitter 454 first converts the baseband symbol stream provided by the multi-antenna transmitting processor 457 into a radio frequency symbols stream, which is then provided to the antenna 452.

In Uplink (UL) transmission, the function at gNB 410 is similar to the receiving function at UE 450 described in the DL transmission. Each receiver 418 receives a radio frequency signal through the respective antenna 420, converts the received radio frequency signal into a baseband signal, and provides the baseband signal to the multi-antenna receiving processor 472 and the receiving processor 470. The multi-antenna receiving processor 472 and the receiving processor 470 jointly performs the function of the L1 layer. The controller/processor 475 performs L2 layer function. The controller/processor 475 can be associated with the memory 476 that stores program code and data. The memory 476 may be called a computer readable medium. In UL transmission, the controller/processor 475 performs demultiplexing, packet reassembly, decryption, header decompression, and control signal processing between the transmission and logical channels to recover upper layer data packets from the UE 450. The upper layer data packets from controller/processor 475 can be provided to the core network. The controller/processor 475 is also responsible for error detection using ACK and/or NACK protocols to support HARQ operations.

In one embodiment, the UE 450 device includes at least one processor and at least one memory. The at least one memory includes computer program codes. The at least one memory and the computer program codes are configured to be used in collaboration with the at least one processor. The UE 450 device at least receives the M first-type reference signals of the present disclosure respectively in the M first-type air interface resources of the present disclosure, receives the first wireless signal of the present disclosure, and transmits the first report information of the present disclosures, wherein the first spatial reception parameter of the present disclosure is used for reception of the first wireless signal; measurement of only M1 first-type reference signal(s) of the M first-type reference signals is used to generate the first report information; selection of the M1 first-type reference signal(s) is associated with the first spatial reception parameter.

In one embodiment, the UE 450 includes a memory that stores a computer readable instruction program. The computer readable instruction program generates an action when executed by at least one processor. The action includes receiving the M first-type reference signals of the present disclosure respectively in the M first-type air interface resources of the present disclosure, receiving the first wireless signal of the present disclosure, and transmitting the first report information of the present disclosures, wherein the first spatial reception parameter of the present disclosure is used for reception of the first wireless signal; measurement of only M1 first-type reference signal(s) of the M first-type reference signals is used to generate the first report information; selection of the M1 first-type reference signal(s) is associated with the first spatial reception parameter.

In one embodiment, the gNB 410 includes at least one processor and at least one memory. The at least one memory includes computer program codes. The at least one memory and the computer program codes are configured to be used in collaboration with the at least one processor. The gNB 410 at least transmits the M first-type reference signals of the present disclosure respectively in the M first-type air interface resources of the present disclosure, transmits the first wireless signal of the present disclosure, and receives the first report information of the present disclosures, wherein the first spatial reception parameter of the present disclosure is used for reception of the first wireless signal; measurement of only M1 first-type reference signal(s) of the M first-type reference signals is used to generate the first report information; selection of the M1 first-type reference signal(s) is associated with the first spatial reception parameter.

In one embodiment, the gNB 410 includes a memory that stores a computer readable instruction program. The computer readable instruction program generates an action when executed by at least one processor. The action includes transmitting the M first-type reference signals of the present disclosure respectively in the M first-type air interface resources of the present disclosure, transmitting the first wireless signal of the present disclosure, and receiving the first report information of the present disclosures, wherein the first spatial reception parameter of the present disclosure is used for reception of the first wireless signal; measurement of only M1 first-type reference signal(s) of the M first-type reference signals is used to generate the first report information; selection of the M1 first-type reference signal(s) is associated with the first spatial reception parameter.

In one embodiment, the gNB 410 corresponds to the base station in the disclosure.

In one embodiment, the UE 450 corresponds to the user equipment in the disclosure.

In one embodiment, at least one of the antenna 452, the receiver 454, the receiving processor 456, the multi-antenna receiving processor 458, the controller/processor 459, the memory 460, and the data source 467 is used to receive the M first-type reference signals of the present disclosure respectively in the M first-type air interface resources of the present disclosure; at least one of the antenna 420, the transmitter 418, the transmitting processor 416, the multi-antenna transmitting processor 471, the controller/processor 475, and the memory 476 is used to transmit the M first-type reference signals of the present disclosure respectively in the M first-type air interface resources of the present disclosure.

In one embodiment, at least one of the antenna 452, the receiver 454, the receiving processor 456, the multi-antenna receiving processor 458, the controller/processor 459, the memory 460, and the data source 467 is used to receive the first wireless signal of the present disclosure; at least one of the antenna 420, the transmitter 418, the transmitting processor 416, the multi-antenna transmitting processor 471, the controller/processor 475, and the memory 476 is used to transmit the first wireless signal of the present disclosure.

In one embodiment, at least one of the antenna 452, the receiver 454, the receiving processor 456, the multi-antenna receiving processor 458, the controller/processor 459, the memory 460, and the data source 467 is used to receive the first report information of the present disclosure; at least one of the antenna 420, the transmitter 418, the transmitting processor 416, the multi-antenna transmitting processor 471, the controller/processor 475, and the memory 476 is used to transmit the first report information of the present disclosure.

In one embodiment, at least one of the antenna 452, the receiver 454, the receiving processor 456, the multi-antenna receiving processor 458, the controller/processor 459, the memory 460, and the data source 467 is used to receive the first information of the present disclosure; at least one of the antenna 420, the transmitter 418, the transmitting processor 416, the multi-antenna transmitting processor 471, the controller/processor 475, and the memory 476 is used to transmit the first information of the present disclosure.

In one embodiment, at least one of the antenna 452, the receiver 454, the receiving processor 456, the multi-antenna receiving processor 458, the controller/processor 459, the memory 460, and the data source 467 is used to receive the second signaling of the present disclosure; at least one of the antenna 420, the transmitter 418, the transmitting processor 416, the multi-antenna transmitting processor 471, the controller/processor 475, and the memory 476 is used to transmit the second signaling of the present disclosure.

In one embodiment, at least one of the antenna 452, the receiver 454, the receiving processor 456, the multi-antenna receiving processor 458, the controller/processor 459, the memory 460, and the data source 467 is used to receive the first signaling of the present disclosure; at least one of the antenna 420, the transmitter 418, the transmitting processor 416, the multi-antenna transmitting processor 471, the controller/processor 475, and the memory 476 is used to transmit the first signaling of the present disclosure.

In one embodiment, at least one of the antenna 452, the receiver 454, the receiving processor 456, the multi-antenna receiving processor 458, the controller/processor 459, the memory 460, and the data source 467 is used to receive the third signaling of the present disclosure; at least one of the antenna 420, the transmitter 418, the transmitting processor 416, the multi-antenna transmitting processor 471, the controller/processor 475, and the memory 476 is used to transmit the third signaling of the present disclosure.

Embodiment V

Figure 5:
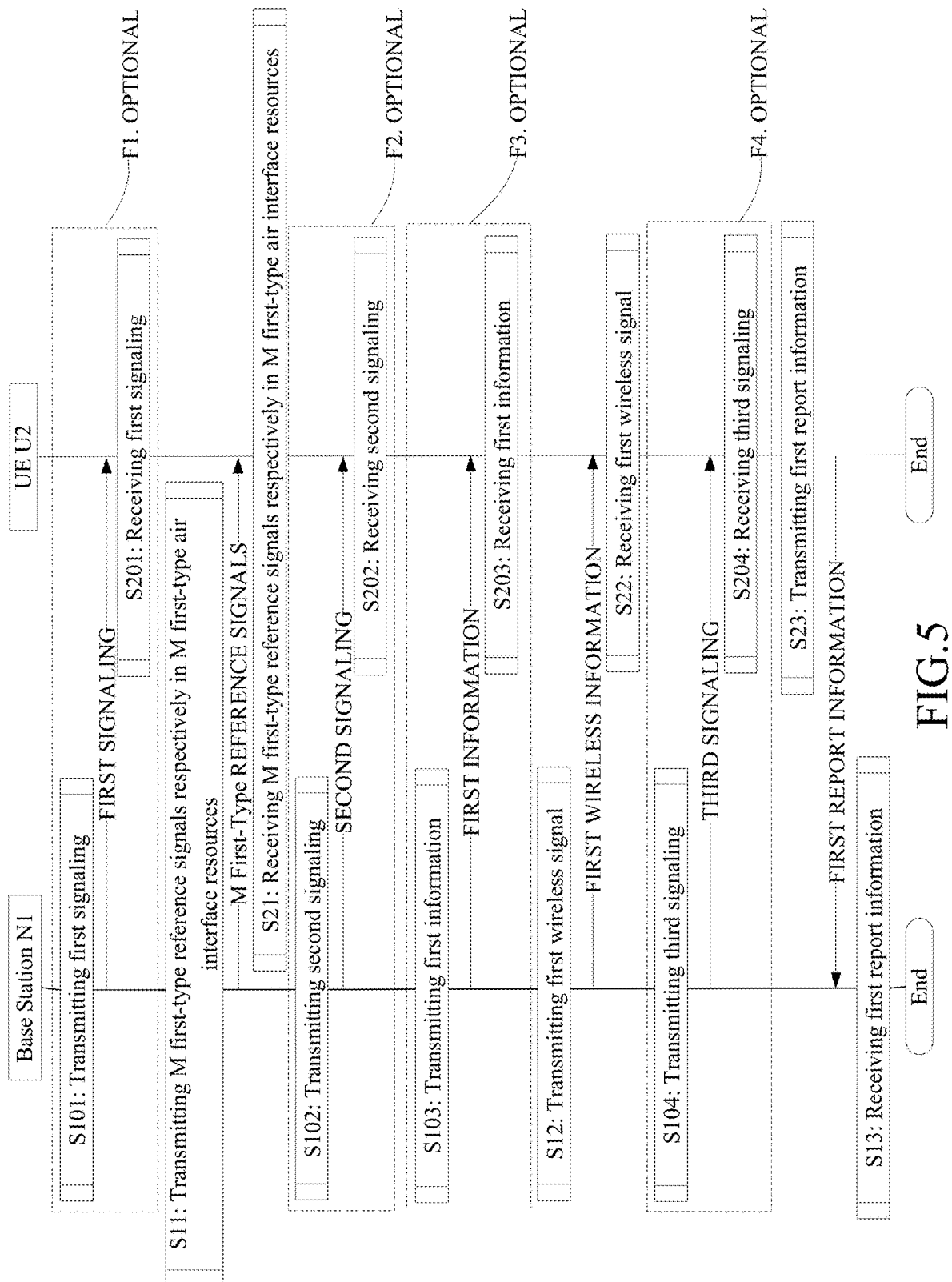
FIG. 5 illustrates a flow chart for wireless transmission according to one embodiment of the present disclosure.

Embodiment V illustrates a flow chart for wireless transmission, as shown in FIG. 5. In FIG. 5, the base station N1 is a maintenance base station in the service cell of the user equipment U2. In FIG. 5, the steps in block F1 to F4 are optional.

For N1, a first signaling is transmitted in step S101; M first-type reference signals are transmitted respectively in M first-type air interface resources in step S11; a second signaling is transmitted in step S102; first information is transmitted in step S103; a first wireless signal is transmitted in step S12; a third signaling is transmitted in step S104; first report information is received in step S13.

For U2, a first signaling is received in step S201; M first-type reference signals are received respectively in M first-type air interface resources in step S21; a second signaling is received in step S202; first information is received in step S203; a first wireless signal is received in step S22; a third signaling is received in step S204; first report information is transmitted in step S23.

In Embodiment, the first spatial reception parameter is used by the U2 for reception of the first wireless signal. The measurement of only M1 first-type reference signal(s) of the M first-type reference signals is used by to the U2 to generate the first report information. The selection of the M1 first-type reference signal(s) is associated with the first spatial reception parameter; M is a positive integer greater than 1, and M1 is a positive integer less than M. The first information indicates a first antenna port group; a transmitting antenna port of the first wireless signal is associated with the first antenna port group; a transmitting antenna port of each of the M1 first-type reference signal(s) is associated with the first antenna port group; the first antenna port group comprises a positive integer number of antenna port(s). The second signaling comprises scheduling information of the first wireless signal. The first signaling indicates a first information unit. The first information unit comprises a first field; the first field of the first information unit is used by the U2 to determine the M first-type air interface resources. The third signaling triggers the transmission of the first report information.

In one embodiment, the first information is dynamic information.

In one embodiment, the first information is physical layer information.

In one embodiment, the first information is dynamically configured.

In one embodiment, the first information is common to the cell.

In one embodiment, the first information is specific to a terminal group, and the terminal group includes a positive integer number of terminal(s). The user equipment in the present disclosure is one terminal of the terminal group.

In one embodiment, the first information is UE specific.

In one embodiment, the first information is carried by a physical layer signaling.

In one embodiment, the first information is carried by a dynamic signaling.

In one embodiment, the first information explicitly indicates the first antenna port group.

In one embodiment, the first information implicitly indicates the first antenna port group.

In one embodiment, the first information is used to determine the first spatial reception parameter.

In one embodiment, the first information is used by the U2 to determine the first spatial reception parameter.

In one embodiment, the first antenna port group is used to determine the first spatial reception parameter.

In one embodiment, the first antenna port group is used by the U2 to determine the first spatial reception parameter.

In one embodiment, the first information is carried by the first wireless signal.

In one embodiment, a transmitting antenna port of any of the M first-type reference signals other than the M1 first-type reference signal(s) is not associated to the first antenna port group.

In one embodiment, the second signaling is a physical layer signaling.

In one embodiment, the second signaling is a dynamic signaling.

In one embodiment, the second signaling is a dynamic signaling for DownLink Grant.

In one embodiment, the second signaling includes DCI (Downlink Control Information).

In one embodiment, the second signaling includes Down-Link Grant DCI.

In one embodiment, the second signaling is UE specific.

In one embodiment, a signaling identifier of the second signaling is C (cell)-RNTI (Radio Network Temporary Identifier).

In one embodiment, the second signaling is DCI identified by C-RNTI.

In one embodiment, the scheduling information of the first wireless signal includes at least one of {time domain resources occupied, frequency domain resources occupied, MCS (Modulation and Coding Scheme), configuration information of DMRS (DeModulation Reference Signals), HARQ (Hybrid Automatic Repeat reQuest) process number, RV (Redundancy Version), NDI (New Data Indicator), transmitting antenna port, the first spatial reception parameter}.

In one embodiment, the configuration information of DMRS includes one or more of {time domain resources occupied, frequency domain resources occupied, code domain resources occupied, RS sequences, mapping methods, DMRS types, cyclic shifts, OCC (Orthogonal Cover Code)}.

In one embodiment, the first information is carried by the second signaling.

In one embodiment, the first signaling is a high layer signaling.

In one embodiment, the first signaling is a RRC (Radio Resource Control) signaling.

In one embodiment, the first signaling is a MAC CE (Medium Access Control Layer Control Element) signaling.

In one embodiment, the first signaling indicates that the M first-type air interface resources are respectively reserved for the M first-type reference signals.

In one embodiment, the first information unit includes a second field. The second field of the first information unit is used by the U2 to determine the content of the first report information.

In one sub-embodiment of the above embodiment, the content of the first report information includes one or more of RI, CRI, PMI, RSPR, RSPQ, and CQI.

In one embodiment, the first information unit includes a third field. The third field of the first information unit indicates that the first report information is associated with M1 first-type air interface resource(s); the M1 first-type air interface resource(s) is(are) first-type air interface resource(s) of the M first-type air interface resources that respectively correspond(s) to the M1 first-type reference signal(s).

In one embodiment, the first information unit includes a fourth field. The fourth field of the first information unit indicates a first index, the first index being used to trigger transmission of the first report information.

In one sub-embodiment of the above embodiment, the first index is unrelated to (a) location(s) of the M1 first-type air interface resource(s) in the M first-type air interface resources.

In one sub-embodiment of the above embodiment, the first index is unrelated to the M1.

In one embodiment, the first signaling indicates that the first index is associated with the first report information.

In one embodiment, the first signaling indicates that the first index is associated with the M first-type air interface resources.

In one embodiment, the first signaling indicates that the first index is associated with the M first-type reference signals.

In one embodiment, the first signaling indicates that the first index is used to trigger CSI report of a part or all of the M first-type reference signals.

In one embodiment, the third signaling is a physical layer signaling.

In one embodiment, the third signaling is a dynamic signaling.

In one embodiment, the third signaling includes DCI.

In one embodiment, the third signaling includes DCI for UpLink Grant.

In one embodiment, the third signaling is UE specific.

In one embodiment, a signaling identifier of the third signaling is C-RNTI.

In one embodiment, the first wireless signal is transmitted on a downlink physical layer control channel (that is a downlink channel only capable of carrying physical layer signalings).

In one sub-embodiment of the above embodiment, the downlink physical layer control channel is a PDCCH (Physical Downlink Control Channel).

In one sub-embodiment of the above embodiment, the downlink physical layer control channel is an EPDCCH (Enhanced PDCCH).

In one sub-embodiment of the above embodiment, the downlink physical layer control channel is a sPDCCH (short PDCCH).

In one sub-embodiment of the above embodiment, the downlink physical layer control channel is a NR-PDCCH (New Radio PDCCH).

In one sub-embodiment of the above embodiment, the downlink physical layer control channel is a NB-PDCCH (Narrow Band PDCCH).

In one embodiment, a transmission channel corresponding to the first wireless signal is a DL-SCH (Downlink Shared Channel).

In one embodiment, the first report information is transmitted on an uplink physical layer control channel (that is an uplink channel only capable of carrying physical layer signalings).

In one sub-embodiment of the above embodiment, the uplink physical layer control channel is a PUCCH (Physical Uplink Control Channel).

In one sub-embodiment of the above embodiment, the uplink physical layer control channel is a sPUCCH (short PUCCH).

In one sub-embodiment of the above embodiment, the uplink physical layer control channel is a NR-PUCCH (New Radio PUCCH).

In one sub-embodiment of the above embodiment, the uplink physical layer control channel is a NB-PUCCH (Narrow Band PUCCH).

In one embodiment, the first report information is transmitted on an uplink physical layer data channel (that is an uplink channel capable of carrying physical layer data).

In one sub-embodiment of the above embodiment, the uplink physical layer data channel is a PUSCH (Physical Uplink Shared Channel).

In one sub-embodiment of the above embodiment, the uplink physical layer data channel is a sPUSCH (short PUSCH).

In one sub-embodiment of the above embodiment, the uplink physical layer data channel is a NR-PUSCH (New Radio PUSCH).

In one sub-embodiment of the above embodiment, the uplink physical layer data channel is a NB-PUSCH (Narrow Band PUSCH).

In one embodiment, the first information is transmitted on a downlink physical layer control channel (that is a downlink channel only capable of carrying physical layer signalings).

In one sub-embodiment of the above embodiment, the downlink physical layer control channel is a PDCCH.

In one sub-embodiment of the above embodiment, the downlink physical layer control channel is an EPDCCH.

In one sub-embodiment of the above embodiment, the downlink physical layer control channel is a sPDCCH.

In one sub-embodiment of the above embodiment, the downlink physical layer control channel is a NR-PDCCH.

In one sub-embodiment of the above embodiment, the downlink physical layer control channel is a NB-PDCCH.

In one embodiment, the second signaling is transmitted on a downlink physical layer control channel (that is a downlink channel only capable of carrying physical layer signalings).

In one sub-embodiment of the above embodiment, the downlink physical layer control channel is a PDCCH.

In one sub-embodiment of the above embodiment, the downlink physical layer control channel is an EPDCCH.

In one sub-embodiment of the above embodiment, the downlink physical layer control channel is a sPDCCH.

In one sub-embodiment of the above embodiment, the downlink physical layer control channel is a NR-PDCCH.

In one sub-embodiment of the above embodiment, the downlink physical layer control channel is a NB-PDCCH.

In one embodiment, the first signaling is transmitted on a downlink physical layer data channel (that is a downlink channel capable of carrying physical layer data).

In one sub-embodiment of the above embodiment, the downlink physical layer data channel is a PDSCH.

In one sub-embodiment of the above embodiment, the downlink physical layer data channel is a sPDSCH.

In one sub-embodiment of the above embodiment, the downlink physical layer data channel is a NR-PDSCH.

In one sub-embodiment of the above embodiment, the downlink physical layer data channel is a NB-PD SCH.

In one embodiment, the third signaling is transmitted on a downlink physical layer control channel (that is a downlink channel only capable of carrying physical layer signalings).

In one sub-embodiment of the above embodiment, the downlink physical layer control channel is a PDCCH.

In one sub-embodiment of the above embodiment, the downlink physical layer control channel is an EPDCCH.

In one sub-embodiment of the above embodiment, the downlink physical layer control channel is a sPDCCH.

In one sub-embodiment of the above embodiment, the downlink physical layer control channel is a NR-PDCCH.

In one sub-embodiment of the above embodiment, the downlink physical layer control channel is a NB-PDCCH.

In one embodiment, the block F4 exists in FIG. 5, the third signaling triggers the transmission of the first report information.

In one embodiment, the block F4 does not exist in FIG. 5 and the block F2 exists in FIG. 5, the second signaling triggers the transmission of the first report information.

In one embodiment, neither the block F4 nor the block F2 exist in FIG. 5, the first wireless signal triggers the transmission of the first report information.

Embodiment VI

Figure 6:
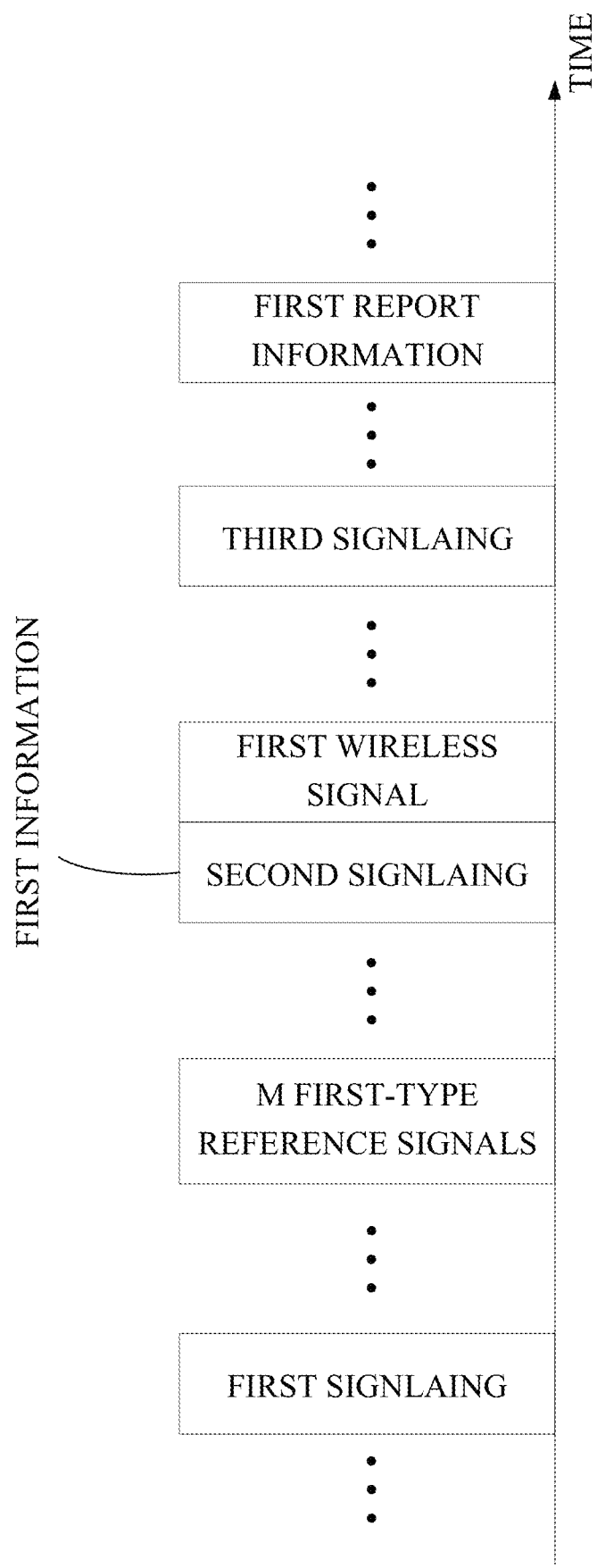
FIG. 6 illustrates a schematic diagram for the timing relationship for a first singling, a second signaling, M first-type reference signals, a first wireless signal, first report information and a third signaling according to one embodiment of the present disclosure.

Embodiment VI illustrates a schematic diagram for the timing relationship for a first singling, a seconding signal, M first-type reference signals, a first wireless signal, first report information and a third signaling, as shown in FIG. 6.

In Embodiment VI, the first singling is used to determine the M first-type air interface resources of the present disclosure. The user equipment of the present disclosure respectively receives the M first-type reference signals respectively in the M first-type air interface resources. The second signaling includes the scheduling information of the first wireless signal. The first spatial reception parameter is used for reception of the first wireless signal. The first spatial reception parameter is used to select the M1 first-type reference signal(s) of the present disclosure from the M first-type reference signals. The measurement of only the M1 first-type reference signal(s) of the M first-type reference signals is used to generate the first report information. The third signaling triggers the transmission of the first report information. The timing relationship for the first singling, the second signal, the M first-type reference signals, the first wireless signal, the first report information and the third signaling is shown in FIG. 6.

In one embodiment, the first wireless signal includes downlink data.

In one embodiment, the second signaling indicates the first information of the present disclosure.

In one embodiment, the second signaling explicitly indicates the first information.

In one embodiment, the first information is composed of partial information bits of the second signaling.

In one embodiment, the second signaling indicates the first antenna port group in the present disclosure.

In one embodiment, the second signaling explicitly indicates the first antenna port group.

In one embodiment, the second signaling includes a seventh field. The seventh field of the second signaling indicates the first information.

In one sub-embodiment of the above embodiment, the seventh field of the second signaling indicates the first antenna port group.

In one sub-embodiment of the above embodiment, the seventh field of the second signaling is a Transmission configuration indication field.

In one sub-embodiment of the above embodiment, a specific definition of the Transmission configuration indication field may refer to Section 7.3.1 in 3GPP TS38.212.

In one sub-embodiment of the above embodiment, a specific definition of the Transmission configuration indication field may refer to Section 7.3.1 in 3GPP TS38.212 (V15.0.0).

In one embodiment, the second signaling implicitly indicates the first information.

In one embodiment, the second signaling implicitly indicates the first antenna port group.

In one embodiment, at least one transmitting antenna port of the second signaling and at least one antenna port of the first antenna port group are QCL (Quasi Co-Located).

In one embodiment, a QCL type of at least one transmitting antenna port of the second signaling and at least one antenna port of the first antenna port group is QCL-TypeD.

In one embodiment, the user equipment can infer spatial reception parameters (Spatial Rx parameters) of the second signaling from spatial reception parameters (Spatial Rx parameters) of a wireless signal transmitted from the first antenna port group.

In one embodiment, the user equipment uses same spatial reception parameters (Spatial Rx parameters) to receive the second signaling and a wireless signal from the first antenna port group.

In one embodiment, the second signaling indicates the first spatial reception parameter.

In one embodiment, the second signaling explicitly indicates the first spatial reception parameter.

In one embodiment, the second signaling implicitly indicates the first spatial reception parameter.

In one embodiment, the user equipment can infer the first spatial reception parameter from spatial reception parameters (Spatial Rx parameters) of a wireless signal transmitted from the first antenna port group.

In one embodiment, the first spatial reception parameter is used to receive a wireless signal transmitted from the first antenna port group.

In one embodiment, the user equipment can infer the first spatial reception parameter from spatial reception parameters (Spatial Rx parameters) of the second signaling.

In one embodiment, the first spatial reception parameter is used to receive the second signaling.

In one embodiment, the third signaling includes a ninth field. The ninth field of the third signaling indicates the first index of the present disclosure.

In one sub-embodiment of the above embodiment, the ninth field of the third signaling is a CSI request field.

In one sub-embodiment of the above embodiment, a specific definition of the CSI request field may refer to Section 7.3.1 in 3GPP TS38.212.

In one sub-embodiment of the above embodiment, a specific definition of the CSI request field may refer to Section 7.3.1 in 3GPP TS38.212 (V15.0.0).

Embodiment VII

Figure 7:
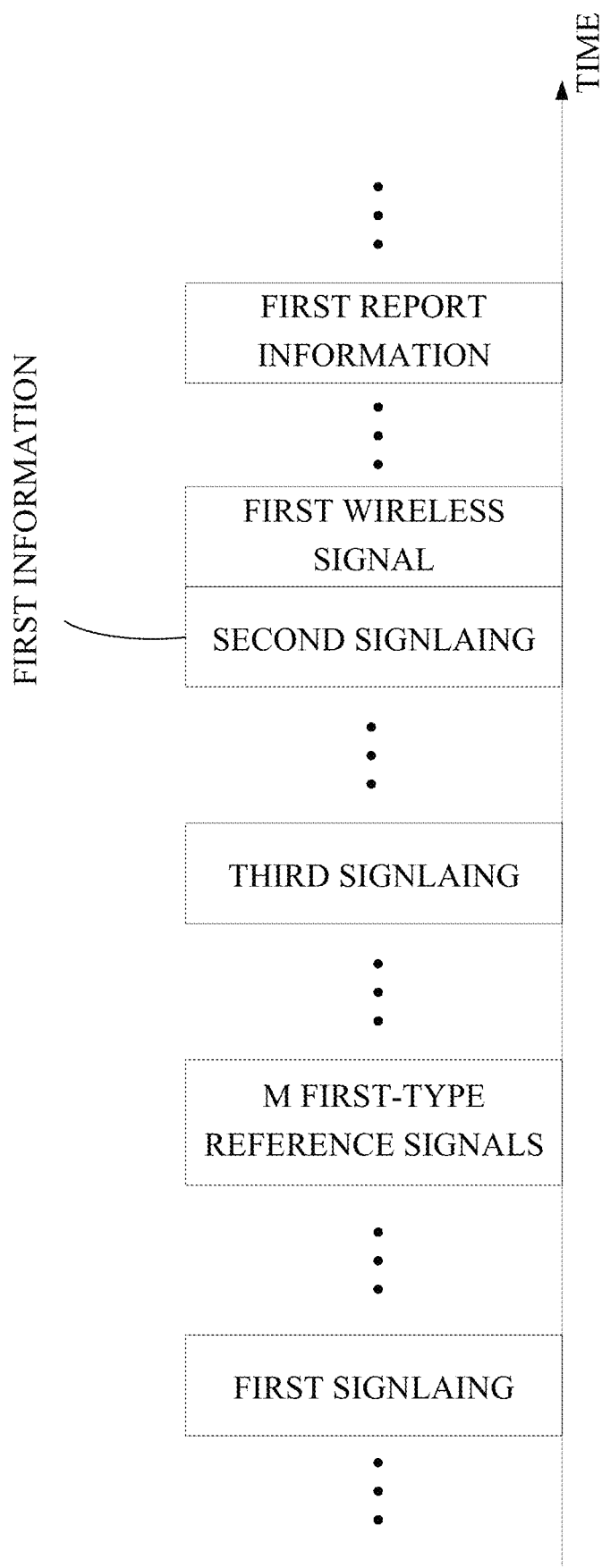
FIG. 7 illustrates a schematic diagram for the timing relationship for a first singling, a second signaling, M first-type reference signals, a first wireless signal, first report information and a third signaling according to another embodiment of the present disclosure.

Embodiment VII illustrates a schematic diagram for the timing relationship for a first singling, a second signaling, M first-type reference signals, a first wireless signal, first report information and a third signaling, as shown in FIG. 7.

In Embodiment VII, the first signaling is used to determine the M first-type air interface resources of the present disclosure. The user equipment of the present disclosure receives the M first-type reference signals respectively in the M first-type air interface resources. The second signaling includes the scheduling information of the first wireless signal. The first spatial reception parameter of the present disclosure is used to receive the first wireless signal. The first spatial reception parameter is used to select the M1 first-type reference signal(s) of the present disclosure from the M first-type reference signals. The measurement of only the M1 first-type reference signal(s) of the M first-type reference signals is used to generate the first report information. The third signaling triggers the transmission of the first report information. The timing relationship for the first singling, the M first-type reference signals, the third signaling, the second signaling, the first wireless signal, and the first report information is shown in FIG. 7.

Embodiment VIII

Figure 8:
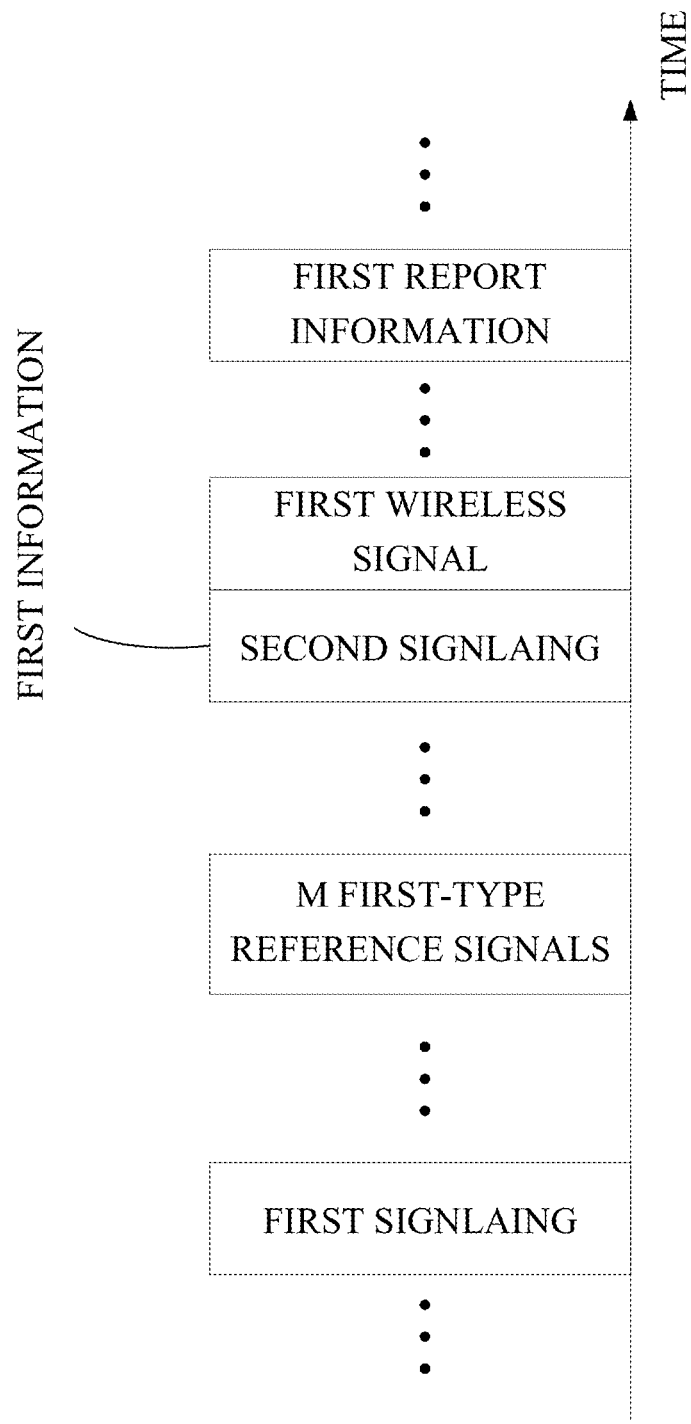
FIG. 8 illustrates a schematic diagram for the timing relationship for a first singling, a second signaling, M first-type reference signals, a first wireless signal, first report information and a third signaling according to another embodiment of the present disclosure.

Embodiment VIII illustrates a schematic diagram for the timing relationship for a first singling, a second signaling, M first-type reference signals, a first wireless signal, and first report information, as shown in FIG. 8.

In Embodiment VIII, the first signaling is used to determine the M first-type air interface resources of the present disclosure. The user equipment of the present disclosure receives the M first-type reference signals respectively in the M first-type air interface resources. The second signaling includes the scheduling information of the first wireless signal. The first spatial reception parameter of the present disclosure is used to receive the first wireless signal. The first spatial reception parameter is used to select the M1 first-type reference signal(s) of the present disclosure from the M first-type reference signals. The measurement of only the M1 first-type reference signal(s) of the M first-type reference signals is used to generate the first report information. The second signaling triggers the transmission of the first report information. The timing relationship for the first singling, the M first-type reference signals, the second signaling, the first wireless signal, and the first report information is shown in FIG. 8.

In one embodiment, the second signaling triggers the transmission of the first report information.

In one embodiment, the second signaling includes a fifth field. The fifth field of the second signaling indicates the first index of the present disclosure.

In one sub-embodiment of the above embodiment, the fifth field of the second signaling is a CSI request field.

In one sub-embodiment of the above embodiment, a specific definition of the CSI request field may refer to Section 7.3.1 in 3GPP TS38.212.

In one sub-embodiment of the above embodiment, a specific definition of the CSI request field may refer to Section 7.3.1 in 3GPP TS38.212 (V15.0.0).

Embodiment IX

Figure 9:
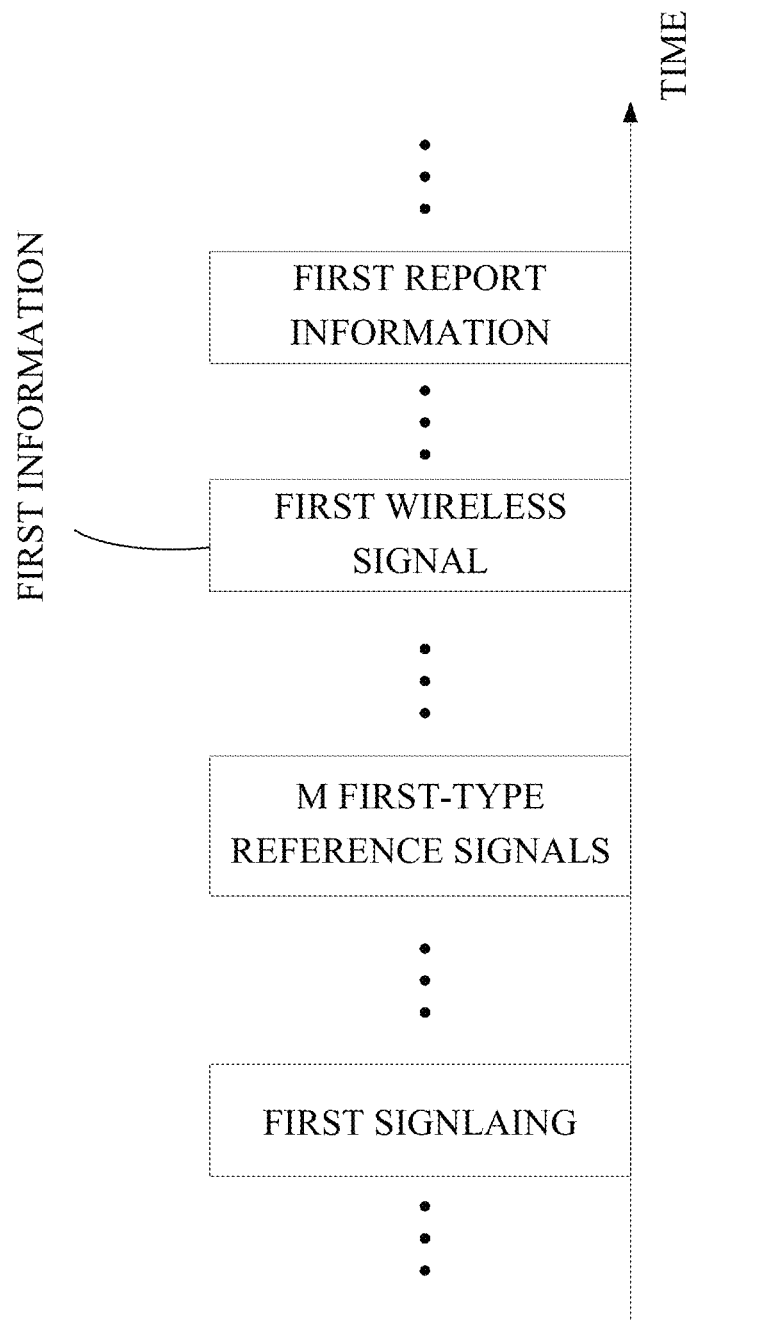
FIG. 9 illustrates a schematic diagram for the timing relationship for a first singling, M first-type reference signals, a first wireless signal and first report information according to another embodiment of the present disclosure.

Embodiment IX illustrates a schematic diagram for the timing relationship for a first singling, M first-type reference signals, a first wireless signal, and first report information, as shown in FIG. 9.

In Embodiment IX, the first signaling is used to determine the M first-type air interface resources of the present disclosure. The user equipment of the present disclosure receives the M first-type reference signals respectively in the M first-type air interface resources. The first spatial reception parameter of the present disclosure is used to receive the first wireless signal. The first spatial reception parameter is used to select the M1 first-type reference signal(s) of the present disclosure from the M first-type reference signals. The measurement of only the M1 first-type reference signal(s) of the M first-type reference signals is used to generate the first report information. The first wireless signal triggers the transmission of the first report information. The timing relationship for the first singling, the M first-type reference signals, the first wireless signal, and the first report information is shown in FIG. 9.

In one embodiment, the first wireless signal includes a physical layer signaling.

In one embodiment, the first wireless signal includes a dynamic signaling.

In one embodiment, the first wireless signal includes DCI.

In one embodiment, the first wireless signal includes DCI for UpLink Grant.

In one embodiment, the first wireless signal includes a UE specific dynamic signaling.

In one embodiment, the first wireless signal includes a dynamic signaling identified by C-RNTI.

In one embodiment, the first wireless signal includes a terminal group specific dynamic signaling. The terminal group includes a positive integer number of terminal(s). The user equipment is one terminal of the terminal group.

In one embodiment, the first wireless signal includes a dynamic signaling common to the cell.

In one embodiment, the first wireless signal includes a dynamic signaling identified by CC (Component Carrier)-RNTI.

In one embodiment, the first wireless signal triggers the transmission of the first report information.

In one embodiment, the first information is carried by the first wireless signal.

In one embodiment, the first wireless signal explicitly indicates the first information.

In one embodiment, the first wireless signal includes an eighth field. The eighth field of the first wireless signal indicates the first information.

In one sub-embodiment of the above embodiment, the eighth field of the first wireless signal includes at least one of a SRS resource indicator field and a Precoding information and number of layers field.

In one sub-embodiment of the above embodiment, a specific definition of the SRS resource indicator field and the Precoding information and number of layers field may refer to Section 7.3.1 in 3GPP TS38.212.

In one sub-embodiment of the above embodiment, a specific definition of the SRS resource indicator field and the Precoding information and number of layers field may refer to Section 7.3.1 in 3GPP TS38.212 (V15.0.0).

In one embodiment, the first wireless signal implicitly indicates the first information.

In one embodiment, the first wireless signal implicitly indicates the first antenna port group.

In one embodiment, at least one transmitting antenna port of the first wireless signal and at least one antenna port of the first antenna port group are QCL.

In one embodiment, a QCL type of at least one transmitting antenna port of the second signaling and at least one antenna port of the first antenna port group is QCL-TypeD.

In one embodiment, the user equipment can infer the first spatial reception parameter from spatial reception parameters (Spatial Rx parameters) of awireless signal transmitted from the first antenna port group.

In one embodiment, the user equipment receives a wireless signal transmitted from the first antenna port group using the first spatial reception parameter.

In one embodiment, the first wireless signal includes a sixth field. The sixth field of the first wireless signal indicates the first index of the present disclosure.

In one sub-embodiment of the above embodiment, the sixth field of the first wireless signal is a CSI request field.

In one sub-embodiment of the above embodiment, a specific definition of the CSI request field may refer to Section 7.3.1 in 3GPP TS38.212.

In one sub-embodiment of the above embodiment, a specific definition of the CSI request field may refer to Section 7.3.1 in 3GPP TS38.212 (V15.0.0).

Embodiment X

Figure 10:
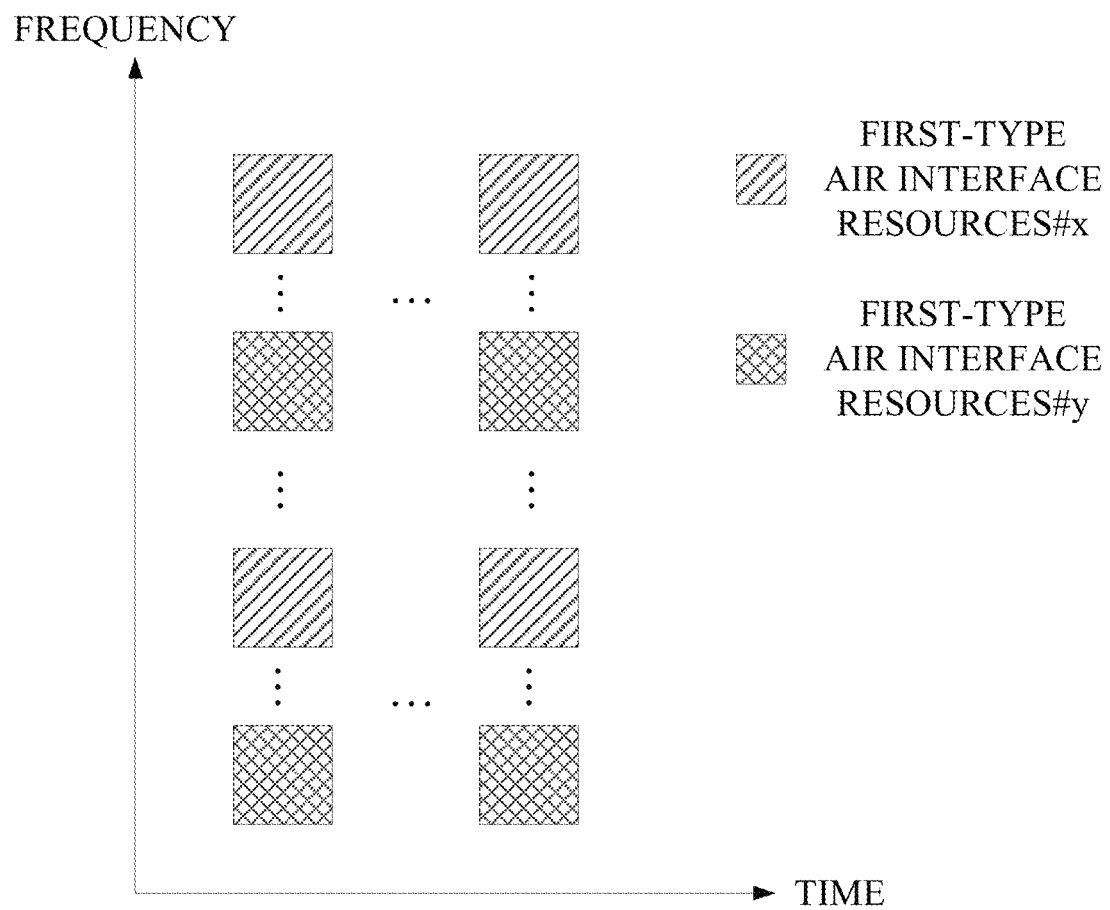
FIG. 10 illustrates a schematic diagram for resource mapping in the time domain of M first-type air interfaces resources according to one embodiment of the present disclosure.

Embodiment X illustrates a schematic diagram for resource mapping in the time domain of M first-type air interfaces resources, as shown in FIG. 10.

In Embodiment X, the user equipment of the present disclosure receives the M first-type reference signals of the present disclosure respectively in the M first-type air interface resources. Any of the M first-type air interface resources includes one or more of {time domain resources, frequency domain resources, code domain resources}. In FIG. 10, the square filled by left slashes indicates first-type air interface resources #x of the M first-type air interface resources, and the square filled by cross lines indicates first-type air interface resources #y of the M first-type air interface resources. x and y are non-negative integers smaller than the M, and x is not equal to y.

In one embodiment, the M first-type air interface resources are M CSI-RS (Channel State Information-Reference Signal) resource settings.

In one embodiment, the M first-type air interface resources are M CSI-RS resource sets.

In one embodiment, the M first-type air interface resources are M CSI-RS resources.

In one embodiment, the M first-type air interface resources are M SSB (Synchronization Signal/Physical Broadcast Channel Block) resources.

In one embodiment, at least one of the M first-type air interface resources is a CSI-RS resource setting.

In one embodiment, at least one of the M first-type air interface resources is a CSI-RS resource set.

In one embodiment, at least one of the M first-type air interface resources is a CSI-RS resource.

In one embodiment, at least one of the M first-type air interface resources is a SSB resource.

In one embodiment, at least one of the M first-type air interface resources is an NZP (Non-Zero Power) CSI-RS resource.

In one embodiment, at least one of the M first-type air interface resources is a ZP (Zero Power) CSI-RS resource.

In one embodiment, at least one of the M first-type air interface resources is a CSI-IM (Interference Measurement) resource.

In one embodiment, any one of the M first-type air interface resources includes one or more of {time domain resources, frequency domain resources, code domain resources}.

In one embodiment, any two of the M first-type air interface resources occupy time-frequency resources that are mutually orthogonal.

In one embodiment, at least two of the M first-type air interface resources occupy time-frequency resources that are mutually orthogonal.

In one embodiment, at least two of the M first-type air interface resources occupy the same time-frequency resources and the code domain resources that are mutually orthogonal.

In one embodiment, any one of the M first-type air interface resources include a positive integer multi-carrier symbol(s) in the time domain.

In one embodiment, at least one of the M first-type air interface resources includes a positive integer number of consecutive multi-carrier symbols in the time domain.

In one embodiment, at least one of the M first-type air interface resources includes a positive integer number of discrete multi-carrier symbols in the time domain.

In one embodiment, any one of the M first-type air interface resources includes a positive integer number of subcarriers in the frequency domain.

In one embodiment, at least one of the M first-type air interface resources includes a positive integer number of discrete subcarriers in the frequency domain.

In one embodiment, a multi-carrier symbol is an OFDM (Orthogonal Frequency Division Multiplexing) symbol.

In one embodiment, a multi-carrier symbol is an SC-FDMA (Single Carrier-Frequency Division Multiple Access) symbol.

In one embodiment, the M first-type reference signals are M CSI-RS.

In one embodiment, the M first-type reference signals are M SS (Synchronization Signal)/PBCH (Physical Broadcast Channel) blocks.

In one embodiment, at least one of the M first-type reference signals includes a CSI-RS.

In one embodiment, at least one of the M first-type reference signals includes an NZP CSI-RS.

In one embodiment, at least one of the M first-type reference signals includes a ZP CSI-RS.

In one embodiment, at least one of the M first-type reference signals includes a SS/PBCH block.

In one embodiment, at least one of the M1 first-type reference signal(s) includes an NZP CSI-RS.

In one embodiment, at least one of the M1 first-type reference signal(s) includes a ZP CSI-RS.

In one embodiment, at least one of the M first-type reference signals occurs multiple times in the time domain.

In one embodiment, at least one of the M first-type reference signals occurs multiple times in the time domain with an equal time interval between any two adjacent occurrences.

In one embodiment, at least one of the M first-type reference signals occurs only once in the time domain.

In one embodiment, at least one of the M first-type reference signals is wideband.

In one embodiment, the system bandwidth is divided into a positive integer number of frequency domain regions. At least one of the M first-type reference signals occurs in each of the positive integer number of frequency domain regions. Any of the positive integer number of frequency domain regions includes a positive integer number of consecutive subcarriers.

In one sub-embodiment of the above embodiment, the number of the subcarriers included in any two of the positive integer number of frequency domain regions is the same.

In one embodiment, at least one of the M first-type reference signals is narrowband.

In one embodiment, the system bandwidth is divided into a positive integer number of frequency domain regions. At least one of the M first-type reference signals occurs only in a part of the positive integer number of frequency domain regions. Any of the positive integer number of frequency domain regions includes a positive integer number of consecutive subcarriers.

In one sub-embodiment of the above embodiment, the number of the subcarriers included in any two of the positive integer number of frequency domain regions is the same.

Embodiment XI

Figure 11:
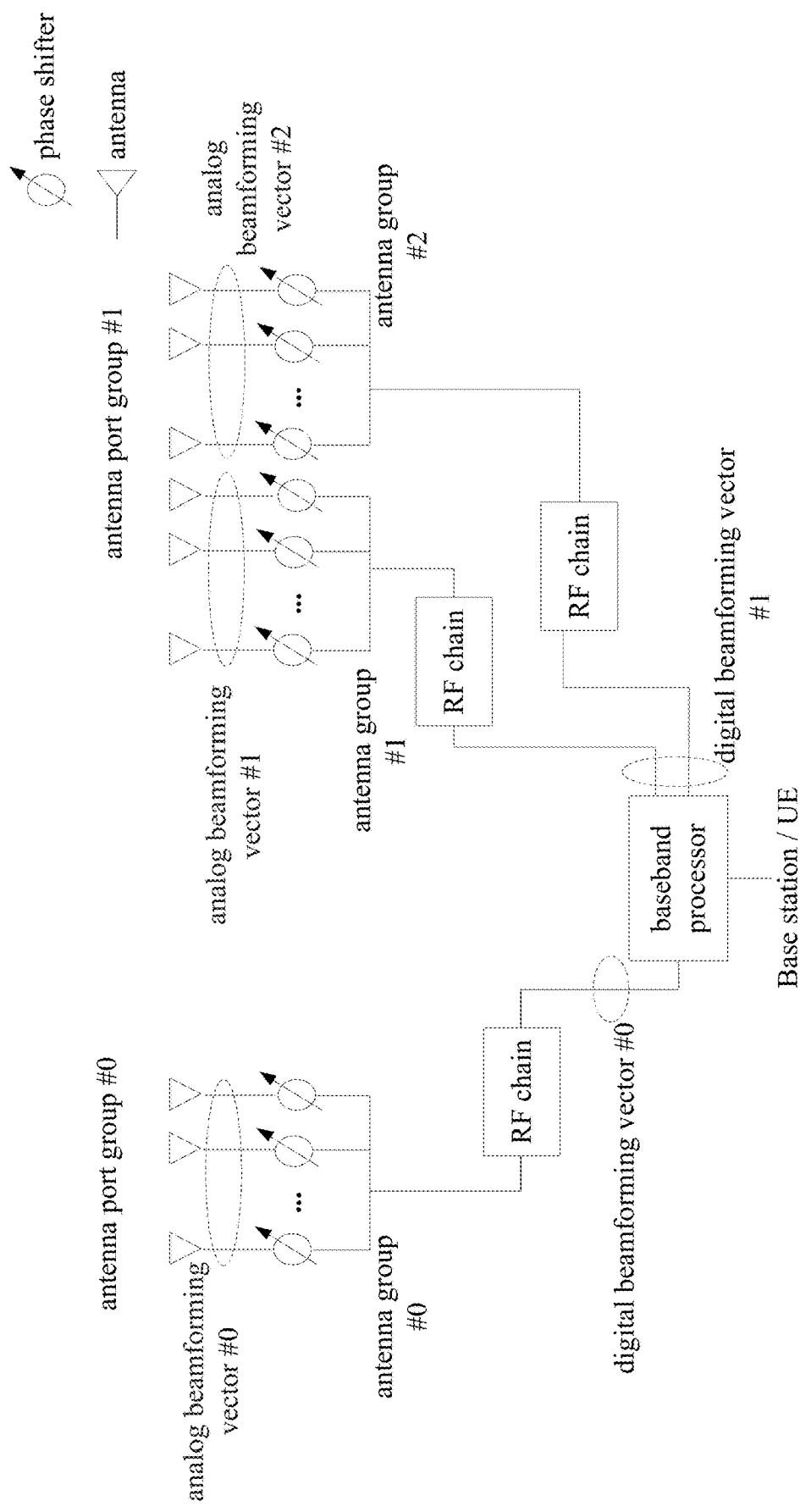
FIG. 11 illustrates a schematic diagram for an antenna port and an antenna port group according to one embodiment of the present disclosure.

Embodiment XI illustrates a schematic diagram for an antenna port and an antenna port group, as shown in FIG. 11.

In Embodiment XI, an antenna port group includes a positive integer number of antenna port(s). An antenna port is formed by superposition of antennas in a positive integer number of antenna group(s) through antenna virtualization. One antenna group includes a positive integer number of antennas. An antenna group is connected to the baseband processor via an RF (Radio Frequency) chain. Different antenna groups correspond to different RF chains.

Mapping coefficients from all antennas within a positive integer number of antenna group(s) included in a given antenna port to the given antenna port constitute a beamforming vector corresponding to the given antenna port. Mapping coefficients from multiple antennas of any given antenna group within the positive integer number of antenna group(s) included in the given antenna port to the given antenna port constitutes an analog beamforming vector for the given antenna group. Analog beamforming vector(s) corresponding to the positive integer number of antenna group(s) included in the given antenna port diagonalize(s) to form an analog beamforming matrix corresponding to the given antenna port. Mapping coefficient(s) from the positive integer number of antenna group(s) included in the given antenna port to the given antenna port constitute(s) a digital beamforming vector corresponding to the given antenna port. The beamforming vector corresponding to the given antenna port is obtained by multiplying the analog beamforming matrix and the digital beamforming vector corresponding to the given antenna port. Different antenna ports in one antenna port group are composed of the same antenna group, and different antenna ports in the same antenna port group correspond to different beamforming vectors.

FIG. 11 shows two antenna port groups: antenna port group #0 and antenna port group #1. The antenna port group #0 is composed of the antenna group #0, and the antenna port group #1 is composed of the antenna group #1 and the antenna group #2. Mapping coefficients from the plurality of antennas in the antenna group #0 to one antenna port of the antenna port group #0 constitute an analog beamforming vector #0. A mapping coefficient from the antenna group #0 to one antenna port of the antenna port group #0 constitute a digital beamforming vector #0. Mapping coefficients from the plurality of antennas in the antenna group #1 and the plurality of antennas in the antenna group #2 to one antenna port in the antenna port group #1 respectively constitute an analog beamforming vector #1 and an analog beamforming vector #2. Mapping coefficients from the antenna group #1 and the antenna group #2 to one antenna port of the antenna port group #1 constitute a digital beamforming vector #1. The beamforming vector corresponding to one antenna port of the antenna port group #0 is obtained by multiplying the analog beamforming vector #0 and the digital beamforming vector #0. The beamforming vector corresponding to one antenna port in the antenna port group #1 is obtained by the product of the digital beamforming vector #1 and an analog beamforming matrix formed by diagonalization of the analog beamforming vector #1 and the analog beamforming vector #2.

In one embodiment, an antenna port group includes only one antenna group, that is, an RF chain. For example, the antenna port group #0 in FIG. 11.

In one sub-embodiment of the above embodiment, the analog beamforming matrix corresponding to the antenna port in the one antenna port group is dimensionally reduced to an analog beamforming vector. The digital beamforming vector corresponding to the antenna port in the one antenna port group is dimensionally reduced to a scalar. The beamforming vector corresponding to the antenna port in the one antenna port group is equal to its corresponding analog beamforming vector. For example, the antenna port group #0 in FIG. 11 includes only the antenna group #0, the digital beamforming vector #0 in FIG. 11 is dimensionally reduced to a scalar, and the beamforming vector corresponding to the antenna port in the antenna port group #0 is the analog beamforming vector #0.

In one sub-embodiment of the above embodiment, the antenna port group includes one antenna port.

In one embodiment, one antenna port group includes a plurality of antenna groups, that is, a plurality of RF chains. For example, the antenna port group #1 in FIG. 11.

In one sub-embodiment of the above embodiment, the antenna port group includes a plurality of antenna ports.

In one sub-embodiment of the above embodiment, different antenna ports in the one antenna port group correspond to a same analog beamforming matrix.

In one sub-embodiment of the above embodiment, different antenna ports in the one antenna port group correspond to different digital beamforming vectors.

In one embodiment, the antenna ports in different antenna port groups correspond to different analog beamforming matrices.

In one embodiment, a small-scale channel over which a wireless signal from one antenna port is conveyed can be inferred from a small-scale channel over which another wireless signal from the one antenna port is conveyed.

In one sub-embodiment of the above embodiment, the small-scale channel includes one or more of {CIR (Channel Impulse Response), PMI (Precoding Matrix Indicator), CQI and RI}.

In one embodiment, any two antenna ports in one antenna port group is QCL.

In one embodiment, a specific definition of QCL may refer to Section 5.1.5 of 3GPP TS 38.214.

In one embodiment, one antenna port and another antenna port being QCL refers to that all or a portion of large-scale properties of a wireless signal transmitted on the other antenna port can be inferred from all or a portion of large-scale properties of a wireless signal transmitted on the one antenna port.

In one embodiment, the large-scale properties of one wireless signal include one or more of delay spread, Doppler spread, Doppler shift, path loss, average gain, average delay, and Spatial Rx parameters.

In one embodiment, the Spatial Rx parameters include one or more of reception beam, reception analog beamforming matrix, reception analog beamforming vector, reception spatial filter, and spatial domain reception filter.

In one embodiment, one antenna port and another antenna port being QCL refers to that the one antenna port and the other antenna port have at least one identical QCL parameter.

In one embodiment, QCL parameters include one or more of delay spread, Doppler spread, Doppler shift, path loss, average gain, average delay, and Spatial Rx parameters.

In one embodiment, one antenna port and another antenna port being QCL refers to that at least one QCL parameter of the one antenna port can be inferred from at least one QCL parameter of the other antenna port.

In one embodiment, at least one transmitting antenna port of the first wireless signal and at least one antenna port of the first antenna port group in this disclosure are QCL.

In one embodiment, a QCL type of at least one transmitting antenna port of the first wireless signal and at least one antenna port of the first antenna port group in this disclosure is QCL-TypeD.

In one embodiment, at least one transmitting antenna port of each of the M1 first-type reference signal(s) of the present disclosure and at least one antenna port of the first antenna port group are QCL.

In one embodiment, a QCL type of at least one transmitting antenna port of each of the M1 first-type reference signal(s) of the present disclosure and at least one antenna port of the first antenna port group is QCL-TypeD.

In one embodiment, a specific definition of QCL-TypeD can refer to Section 5.1.5 of 3GPP TS 38.214.

In one embodiment, the QCL type between one antenna port and another antenna port being QCL-TypeD refers to that Spatial Rx parameters of a wireless signal transmitted on the one antenna port can be inferred from Spatial Rx parameters of a wireless signal transmitted on the other antenna port.

In one embodiment, the QCL type between one antenna port and another antenna port being QCL-TypeD refers to that a wireless signal transmitted by the one antenna port and a wireless signal transmitted by the other antenna port can be received using same spatial Rx parameters.

In one embodiment, the first antenna port group includes only one antenna port.

In one embodiment, the first antenna port group includes a plurality of antenna ports.

Embodiment XII

Figure 12:
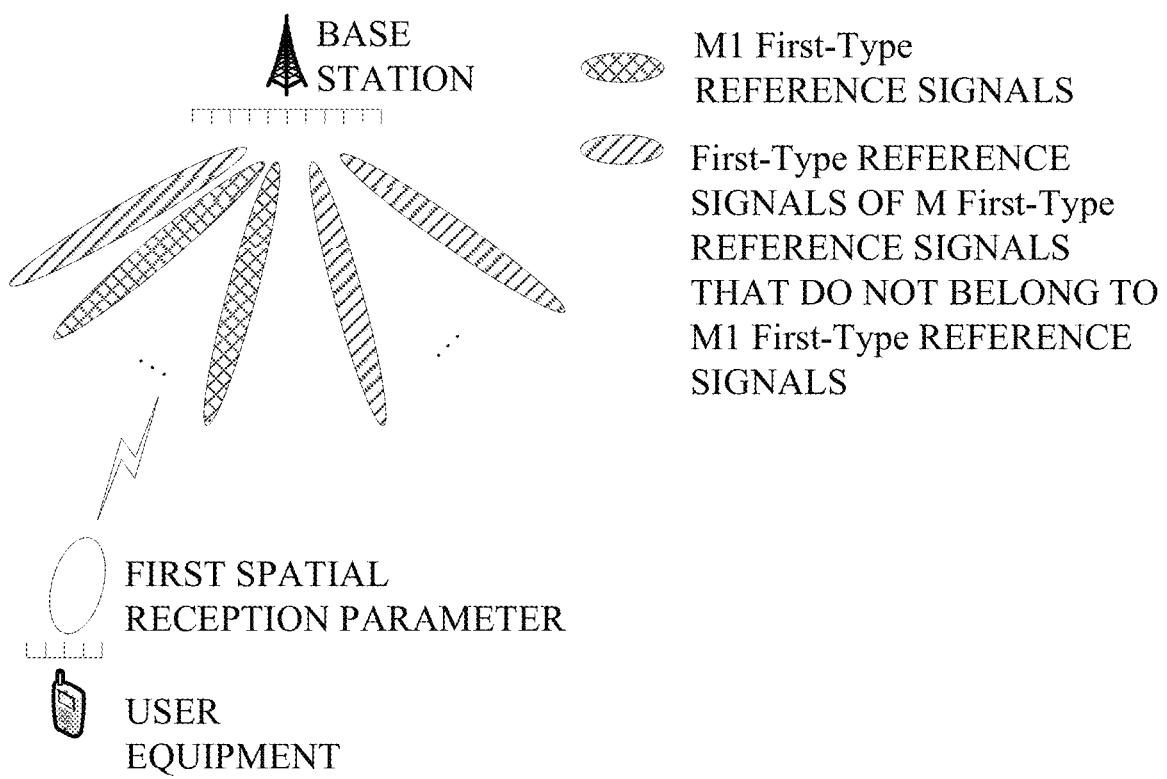
FIG. 12 illustrates a schematic diagram for the selection of M1 first-type reference signal(s) associated with a first spatial reception parameter according to one embodiment of the present disclosure.

Embodiment XII illustrates a schematic diagram for the selection of M1 first-type reference signal(s) associated with a first spatial reception parameter, as shown in FIG. 12.

In Embodiment XII, the first spatial reception parameter is used to select the M1 first-type reference signal(s) from the M first-type reference signals of the present disclosure. In FIG. 12, the ellipse filled with cross lines represents the M1 first-type reference signals; the ellipse filled with left oblique lines represents the first-type reference signals of the M first-type reference signals that do not belong to the M1 first type reference signals.

In one embodiment, the M1 first-type reference signal(s) is(are) associated with the first spatial reception parameter.

In one embodiment, the user equipment of the present disclosure can infer Spatial Rx parameters of each of the M1 first-type reference signal(s) from the first spatial reception parameter.

In one embodiment, the first spatial reception parameter is used for reception of the M1 first-type reference signal(s).

In one embodiment, the first spatial reception parameter is used to determine receiving beam(s) of the M1 first-type reference signal(s).

In one embodiment, the first spatial reception parameter is used to determine the receiving beamforming vector(s) of the M1 first-type reference signal(s).

In one embodiment, the first spatial reception parameter is used to determine the spatial domain reception filter(s) of the M1 first-type reference signal(s).

In one embodiment, the M1 first-type reference signal(s) is(are) composed of all of first-type reference signal(s) of the M first-type reference signals that is(are) associated with the first spatial reception parameter.

In one embodiment, the user equipment cannot infer Spatial Rx parameters of any first-type reference signal of the M first-type reference signals other than the M1 first-type reference signal(s) from the first spatial reception parameter.

In one embodiment, the first spatial reception parameter cannot be used for reception of any first-type reference signal of the M first-type reference signals other than the M1 first-type reference signal(s).

Embodiment XIII

Figure 13:
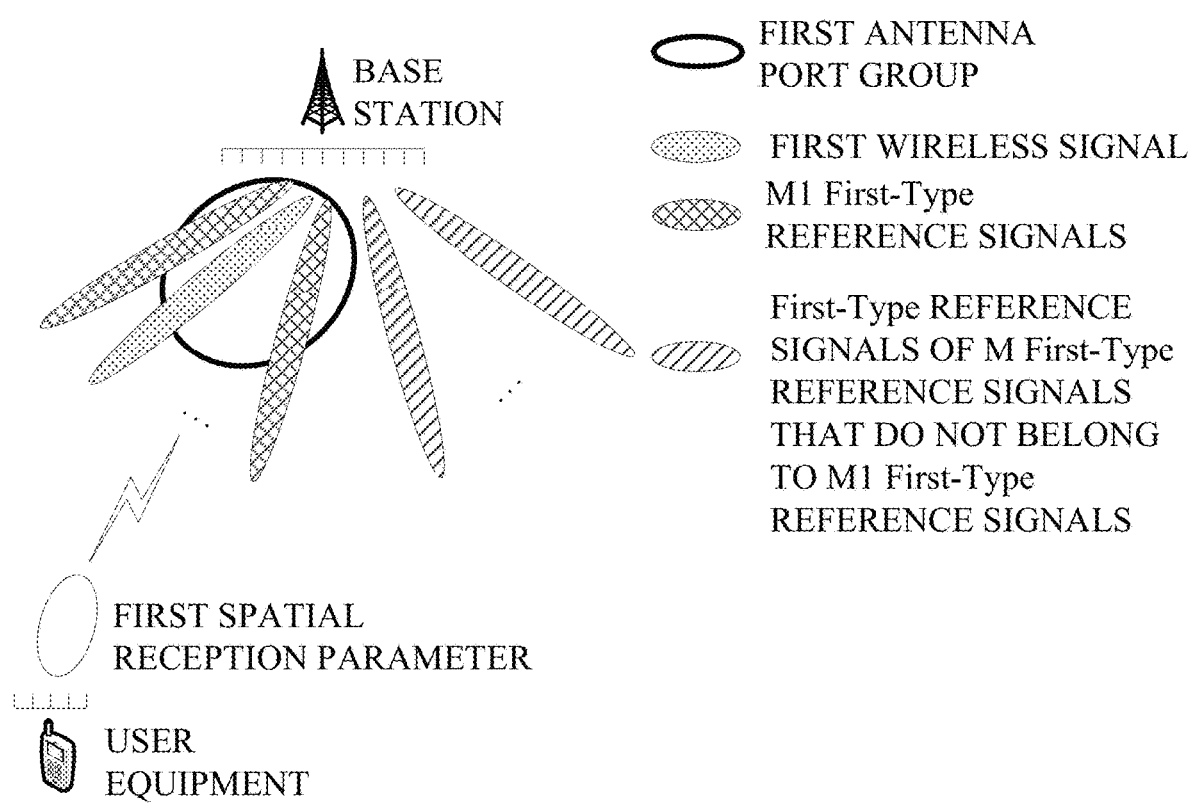
FIG. 13 illustrates a schematic diagram for the relationship of a first antenna port group, transmitting antenna port(s) of a first wireless signal, and transmitting antenna port(s) of each of M1 first-type reference signal(s) according to one embodiment of the present disclosure.

Embodiment XIII illustrates a schematic diagram for the relationship of a first antenna port group, a transmitting antenna port of the first wireless signal, and a transmitting antenna port of each of the M1 first-type reference signal(s), as shown in FIG. 13.

In Embodiment XIII, a transmitting antenna port of the first wireless signal is associated with the first antenna port group. A transmitting antenna port of each of the M1 first-type reference signal(s) is associated with the first antenna port group. In FIG. 13, the ellipse with thick solid border represents the first antenna port group. The ellipse filled with small dots represents the first wireless signal. The ellipses filled with cross lines represent the M1 first-type reference signals. The ellipses filled left slashes represent first-type reference signals of the M first-type reference signals other than the M1 first-type reference signals.

In one embodiment, a transmitting antenna port of any of the M first-type reference signals other than the M1 first-type reference signal(s) is not associated with the first antenna port group.

In one embodiment, the first antenna port group is used to determine the first spatial reception parameter of the present disclosure.

In one embodiment, the first antenna port group is associated with the first spatial reception parameter.

In one embodiment, the user equipment in the present disclosure can infer spatial reception parameters of a wireless signal transmitted on the first antenna port group from the first spatial reception parameter.

In one embodiment, the first spatial reception parameter is used for reception of a wireless signal transmitted from the first antenna port group.

In one embodiment, the first antenna port group is used to select the M1 first-type reference signal(s) from the M first-type reference signals.

In one embodiment, the phrase that a transmitting antenna port of the first wireless signal is associated with the first antenna port group refers to that at least one transmitting antenna port of the first wireless signal and at least one antenna port of the first antenna port group are QCL.

In one embodiment, the phrase that a transmitting antenna port of the first wireless signal is associated with the first antenna port group refers to that the QCL type of at least one transmitting antenna port of the first wireless signal and at least one antenna port of the first antenna port group is QCL-TypeD. A specific definition of QCL-TypeD may refer to Section 5.1.5 of 3GPP TS 38.214.

In one embodiment, the phrase that a transmitting antenna port of the first wireless signal is associated with the first antenna port group refers to that the user equipment in the present disclosure can infer the first spatial reception parameter from Spatial Rx parameters of a wireless signal transmitted on the first antenna port group.

In one embodiment, the phrase that a transmitting antenna port of the first wireless signal is associated with the first antenna port group refers to that the first spatial reception parameter is used to receive a wireless signal transmitted on the first antenna port group.

In one embodiment, the phrase that a transmitting antenna port of each of the M1 first-type reference signal(s) is associated with the first antenna port group refers to that at least one transmitting antenna port of each of the M1 first-type reference signal(s) and at least one antenna port of the first antenna port group are QCL.

In one embodiment, the phrase that a transmitting antenna port of each of the M1 first-type reference signal(s) is associated with the first antenna port group refers to that a QCL type of at least one transmitting antenna port of each of the M1 first-type reference signal(s) and at least one antenna port of the first antenna port group is QCL-TypeD. A specific definition of QCL-TypeD may refer to Section 5.1.5 of 3GPP TS 38.214.

In one embodiment, the phrase that a transmitting antenna port of each of the M1 first-type reference signal(s) is associated with the first antenna port group refers to that the user equipment in the present disclosure can infer Spatial Rx parameters of each of the M1 first-type reference signal(s) from Spatial Rx parameters of a wireless signal transmitted from the first antenna port group.

In one embodiment, the phrase that a transmitting antenna port of each of the M1 first-type reference signal(s) is associated with the first antenna port group refers to that the user equipment in the disclosure receives a wireless signal transmitted on the first antenna port group and each of the M1 first-type reference signal(s) using same Spatial Rx parameters.

In one embodiment, the phrase that a transmitting antenna port of each of the M1 first-type reference signals is associated with the first antenna port group refers to that the user equipment in the present disclosure can infer Spatial Rx parameters of each of the M1 first-type reference signal(s) from the first spatial reception parameter.

In one embodiment, the phrase that a transmitting antenna port of each of the M1 first-type reference signals is associated with the first antenna port group refers to that the user equipment in the present disclosure can receive each of the M1 first-type reference signal(s) using the first spatial reception parameter.

Embodiment XIV

Figure 14:
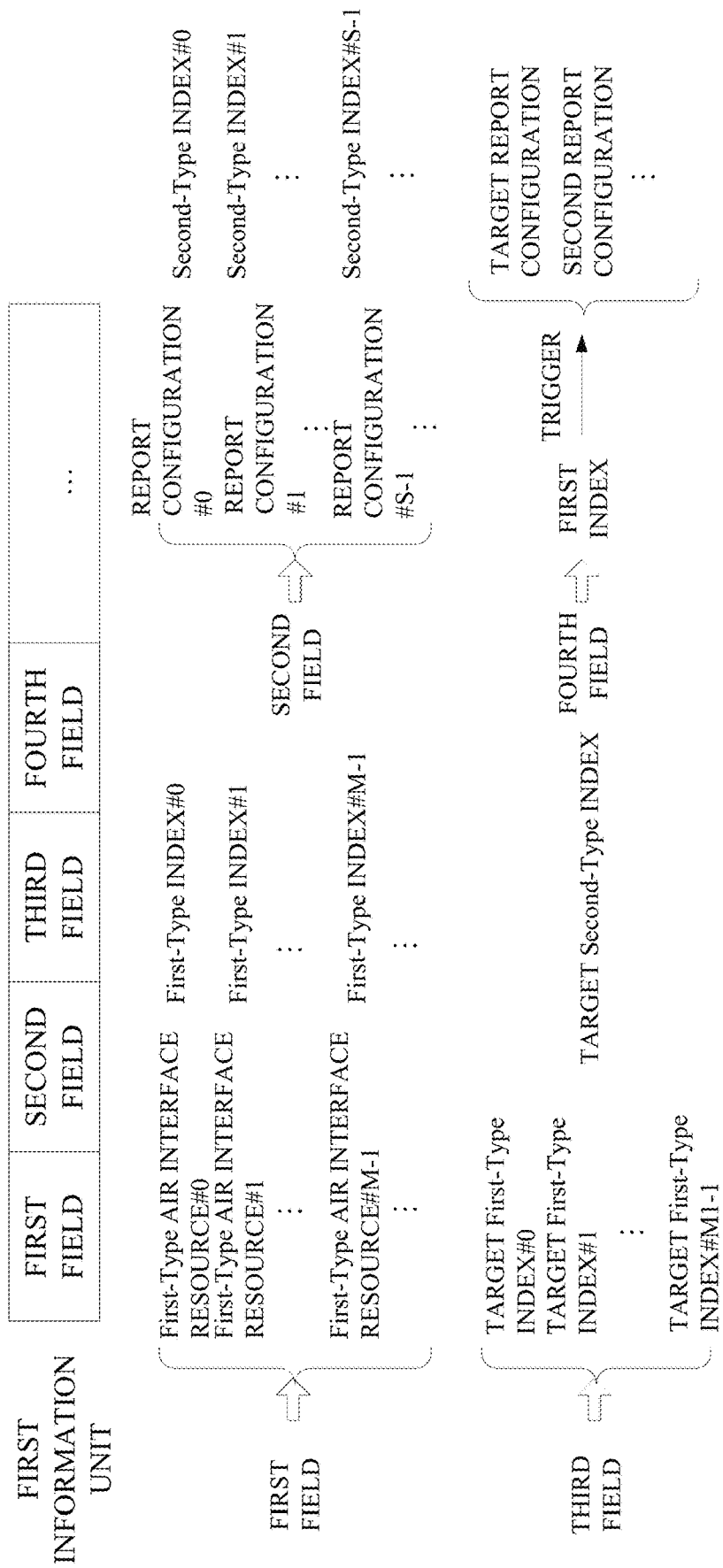
FIG. 14 illustrates a schematic diagram for a first information unit according to one embodiment of the present disclosure.

Embodiment XIV illustrates a schematic diagram for a first information unit, as shown in FIG. 14.

In Embodiment XIV, the first information unit includes the first field of the present disclosure, the second field of the present disclosure, the third field of the present disclosure, and the fourth field of the present disclosure. The first field of the first information unit is used to determine the M first-type air interface resources of the present disclosure. The second field of the first information unit is used to determine the content of the first report information of the present disclosure. The third field of the first information unit indicates that the first report information is associated with M1 first-type air interface resource(s). The M1 first-type air interface resource(s) is(are) first-type air interface resource(s) of the M first-type air interface resources that respectively correspond(s) to the M1 first-type reference signal(s) of the present disclosure. The fourth field of the first information unit indicates the first index of the present disclosure. The first index is used to trigger transmission of the first report information.

In Embodiment XIV, the first field of the first information unit is used to determine the M first-type air interface resources and M first-type indexes. The M first-type air interface resources and the M first-type indexes are in one-to-one correspondence. The second field in the first information unit indicates S report configuration(s) and S second-type index(es). The S report configuration(s) and the S second-type index(es) are in one-to-one correspondence. S is a positive integer. The first report information is report information corresponding to a target report configuration. The target report configuration is one of the S report configuration(s). The target report configuration indicates the content of the first report information. The third field of the first information unit indicates M1 target first-type index(es) and a target second-type index. The M1 target first-type index(es) is(are) first-type index(es) in the M first-type indexes respectively corresponding to the M1 first-type air interface resource(s). The target second-type index is one of the S second-type index(es) corresponding to the target report configuration.

In FIG. 14, the indexes of the M first-type air interface resources and the M first-type indexes are {#0, #1, ..., #M−1} respectively. The index(es) of the S report configuration(s) and the S second-type index(es) is(are){#0, #1, ..., #S−1} respectively. The index(es) of the M1 target first-type index(es) is(are) {#0, #1, ..., #M1−1} respectively.

In one embodiment, at least one of the M first-type indexes is a CSI-RS-ConfigurationId. A specific definition of the CSI-RS-ConfigurationId may refer to 3GPP TS38.331.

In one embodiment, at least one of the M first-type indexes is a CSI-ResourceConfigId. A specific definition of the CSI-ResourceConfigId may refer to 3GPP TS38.331.

In one embodiment, at least one of the M first-type indexes is a CSI-ResourceSetId. A specific definition of the CSI-ResourceSetId may refer to 3GPP TS38.331.

In one embodiment, at least one of the M first-type indexes is an NZP-CSI-RS-ResourceId. A specific definition of the NZP-CSI-RS-ResourceId may refer to 3GPP TS38.331.

In one embodiment, at least one of the M first-type indexes is a ZP-CSI-RS-ResourceId. A specific definition of the ZP-CSI-RS-ResourceId may refer to 3GPP TS38.331.

In one embodiment, at least one of the M first-type indexes is a CSI-IM-ResourceConfigId. A specific definition of the CSI-IM-ResourceConfigId may refer to 3GPP TS38.331.

In one embodiment, the S report configuration(s) indicate(s) S report content(s). Any of the S report content(s) includes one or more of RI, CRI, PMI, RSPR, RSPQ, and CQI.

In one sub-embodiment of the above embodiment, the content of the first report information is one of the S report content(s) indicated by the target report configuration.

In one embodiment, the S is greater than 1.

In one embodiment, the S is equal to 1.

In one embodiment, at least one of the S second-type index(es) is a CSI-ReportConfigId. A specific definition of the CSI-ReportConfigId may refer to 3GPP TS38.331.

In one embodiment, the phrase that the first report information is associated with M1 first-type air interface resource(s) refers to that the target report configuration and the M1 first-type air interface resource(s) are associated.

In one embodiment, the phrase that the first report information is associated with M1 first-type air interface resource(s) refers to that the measurement of reference signals transmitted in the M1 first-type air interface resource(s) is used to generate the first report information.

In one embodiment, the phrase that the first report information is associated with M1 first-type air interface resource(s) refers to that the first repot information is generated only by the measurement of reference signals transmitted in the M1 first-type air interface resource(s).

In one embodiment, the phrase that the first report information is associated with M1 first-type air interface resource(s) refers to that the measurement of reference signals transmitted in the M1 first-type air interface resource(s) is used to generate the content of the first report information.

In one embodiment, the phrase that the first report information is associated with M1 first-type air interface resource(s) refers to that the content of the first report information can only be generated by the measurement of reference signals transmitted in the M1 first-type air interface resource(s).

In one embodiment, the third field of the first information unit indicates that the target report configuration and the M1 first-type air interface resource(s) are associated.

In one embodiment, the third field of the first information unit indicates that the report information corresponding to the target report configuration is generated from the measurement of refence signals transmitted in the M1 first-type air interface resource(s).

In one embodiment, the third field of the first information unit indicates that the report information corresponding to the target report configuration is generated only from the measurement of the refence signals transmitted in the M1 first-type air interface resource(s).

In one embodiment, the first index is used to trigger the transmission of the report information corresponding to the target report configuration.

In one embodiment, the first index is used to trigger a CSI report of reference signals transmitted in the M1 first-type air interface resource(s).

In one embodiment, the first information unit is an IE (Information Element).

In one embodiment, the first information unit is an CSI-MeasConfig IE.

In one embodiment, the first information unit comprises partial or all of the fields in the CSI-MeasConfig IE.

In one embodiment, a specific definition of the CSI-MeasConfig IE may refer to 3GPP TS38.331.

In one embodiment, a specific definition of the CSI-MeasConfig IE may refer to 3GPP TS38.331 (V15.0.0).

In one embodiment, the first field of the first information unit is a csi-ResourceConfigs field.

In one embodiment, the first field of the first information unit includes partial or all of the information of a csi-ResourceConfigs field.

In one embodiment, a specific definition of the csi-ResourceConfigs field may refer to 3GPP TS38.331.

In one embodiment, a specific definition of the csi-ResourceConfigs field may refer to 3GPP TS38.331 (V15.0.0).

In one embodiment, the first field of the first information unit indicates the M first-type air interface resources.

In one embodiment, the first field of the first information unit explicitly indicates the M first-type air interface resources.

In one embodiment, the second field of the first information unit is a csi-ReportConfigs field.

In one embodiment, the second field of the first information unit includes partial or all of the information of a ReportConfigs field.

In one embodiment, a specific definition of the csi-ReportConfigs field may refer to 3GPP TS38.331.

In one embodiment, a specific definition of the csi-ReportConfigs field may refer to 3GPP TS38.331 (V15.0.0).

In one embodiment, the second field of the first information unit indicates the content of the first repot information.

In one embodiment, the second field of the first information unit explicitly indicates the content of the first repot information.

In one embodiment, the content of the first repot information includes one or more of RI, CRI, PMI, RSPR, RSPQ, and CQI.

In one embodiment, the second field of the first information unit is used to determine air interface resources occupied by the first report information.

In one embodiment, air interface resources occupied by the first report information include one or more of {time domain resources, frequency domain resources, code domain resources}.

In one embodiment, the third field of the first information unit is a csi-MeasIdToAddMod field.

In one embodiment, the third field of the first information unit includes partial or all of the information of a csi-MeasIdToAddMod field.

In one embodiment, the third field of the first information unit is a MeasIdToAddModList field.

In one embodiment, the third field of the first information unit includes partial or all of the information of a MeasId-ToAddModList field.

In one embodiment, a specific definition of the csi-MeasIdToAddMod field may refer to 3GPP TS38.331.

In one embodiment, a specific definition of the csi-MeasIdToAddMod field may refer to 3GPP TS38.331 (V15.0.0).

In one embodiment, a specific definition of the csi-MeasIdToAddModList field may refer to 3GPP TS38.331.

In one embodiment, a specific definition of the csi-MeasIdToAddModList field may refer to 3GPP TS38.331 (V15.0.0).

In one embodiment, the fourth field of the first information unit is a reportTrigger field.

In one embodiment, the fourth field of the first information unit includes partial or all of the information of a reportTrigger field.

In one embodiment, the fourth field of the first information unit is a csi-measId field.

In one embodiment, the fourth field of the first information unit includes partial or all of the information of a csi-measId field.

In one embodiment, a specific definition of the reportTrigger field may refer to 3GPP TS38.331.

In one embodiment, a specific definition of the reportTrigger field may refer to 3GPP TS38.331 (V15.0.0).

In one embodiment, a specific definition of the csi-measId field may refer to 3GPP TS38.331.

In one embodiment, a specific definition of the csi-measId field may refer to 3GPP TS38.331 (V15.0.0).

In one embodiment, the first information unit indicates that a second report configuration and M2 first-type air interface resource(s) are associated. The second report configuration is one of the S report configuration(s). The M2 first-type air interface resource(s) is a sub-set of the M first-type air interface resources. M2 is a positive integer smaller than M.

In one sub-embodiment of the above embodiment, at least one of the M2 first-type air interface resource(s) does not belong to the M1 first-type air interface resource(s).

In one sub-embodiment of the above embodiment, at least one of the M1 first-type air interface resource(s) does not belong to the M2 first-type air interface resource(s).

In one sub-embodiment of the above embodiment, no first-type air interface resource of the M first-type air interface resources simultaneously belongs to the M2 first-type air interface resource(s) and the M1 first-type air interface resource(s).

In one embodiment, the first information unit indicates that report information corresponding to the second report configuration is generated by the measurement of reference signals transmitted in the M2 first-type air interface resource(s).

In one embodiment, the first information unit indicates that report information corresponding to the second report configuration is generated only by the measurement of reference signals transmitted in the M2 first-type air interface resource(s).

In one embodiment, the first index is used to trigger the transmission of report information corresponding to the second report configuration.

In one embodiment, the first index is used to trigger a CSI report of reference signals transmitted in the M2 first-type air interface resource(s).

Embodiment XV

Figure 15:
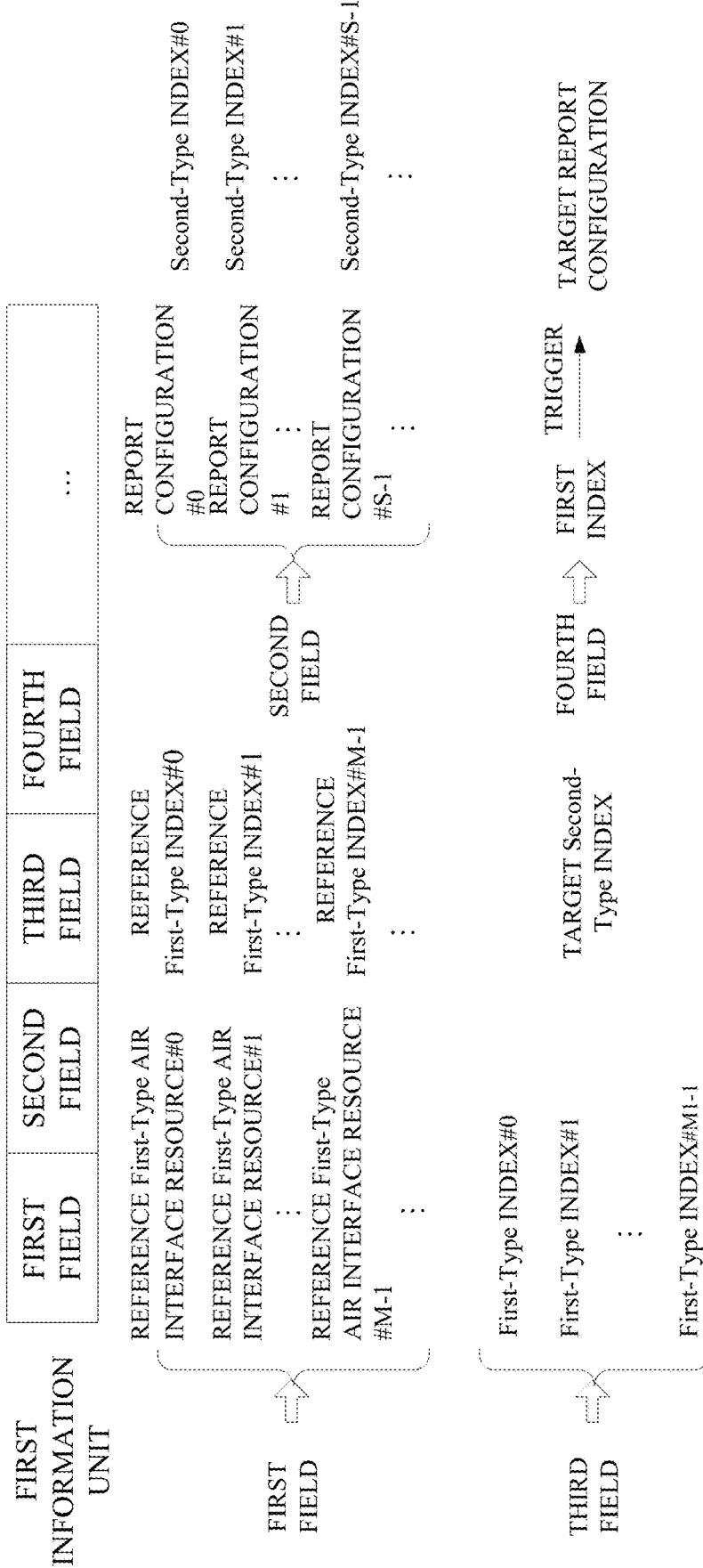
FIG. 15 illustrates a schematic diagram for a first information unit according to another embodiment of the present disclosure.

Embodiment XV illustrates a schematic diagram for a first information unit, as shown in FIG. 15.

In Embodiment XV, the first information unit includes the first field of the present disclosure, the second field of the present disclosure, the third field of the present disclosure, and the fourth field of the present disclosure. The first field of the first information unit is used to determine the M first-type air interface resources. The second field of the first information unit is used to determine the content of the first report information of the present disclosure. The third field of the first information unit indicates that the first report information is associated with M1 first-type air interface resource(s). The M1 first-type air interface resource(s) is(are) first-type air interface resource(s) of the M first-type air interface resources that respectively correspond(s) to the M1 first-type reference signal(s) of the present disclosure. The fourth field of the first information unit indicates the first index of the present disclosure. The first index is used to trigger transmission of the first report information.

In Embodiment XV, the first field of the first information unit indicates N reference first-type air interface resources and N reference first-type indexes. The N reference first-type air interface resources and the N reference first-type indexes are in one-to-one correspondence. The M first-type air interface resources are a sub-set of the N reference first-type air interface resources. N is a positive integer not less than the M. The second field of the first information unit indicates S repot configuration(s) and S second-type index(es). The S repot configuration(s) and the S second-type index(es) are in one-to-one correspondence. S is a positive integer. The first report information is report information corresponding to a target report configuration. The target report configuration is one of the S report configuration(s). The target report configuration indicates the content of the first report information. The third field of the first information unit indicates M first-type indexes and a target second-type index. The M first-type indexes are reference first-type indexes of the N reference first-type indexes corresponding to the M first-type air interface resources. The target second-type index is one of the S second-type index(es) corresponding to the target report configuration.

In FIG. 15, the indexes of the N reference first-type air interface resources and the N reference first-type indexes are {#0, #1, . . . , #N−1} respectively. The index(es) of the S report configuration(s) and the S second-type index(es) is(are) {#0, #1, . . . , #S−1} respectively. The indexes of the M first-type indexes are {#0, #1, . . . , #M−1} respectively.

In one embodiment, the third field of the first information indicates that the target report configuration and the M first-type air interface resources are associated.

In one embodiment, the third field of the first information indicates that the measurement of reference signals transmitted in a part or all of the M first-type air interface resources is used to generate report information corresponding to the target repot configuration.

In one embodiment, the third field of the first information indicates that only the measurement of reference signals transmitted in a part or all of the M first-type air interface resources is used to generate report information corresponding to the target repot configuration.

In one embodiment, the first signaling indicates that the first index and the M first-type air interface resources are associated.

In one embodiment, the first signaling indicates that the first index is used to trigger a CSI report of a part or all of the M first-type reference signals.

Embodiment XVI

Figure 16:
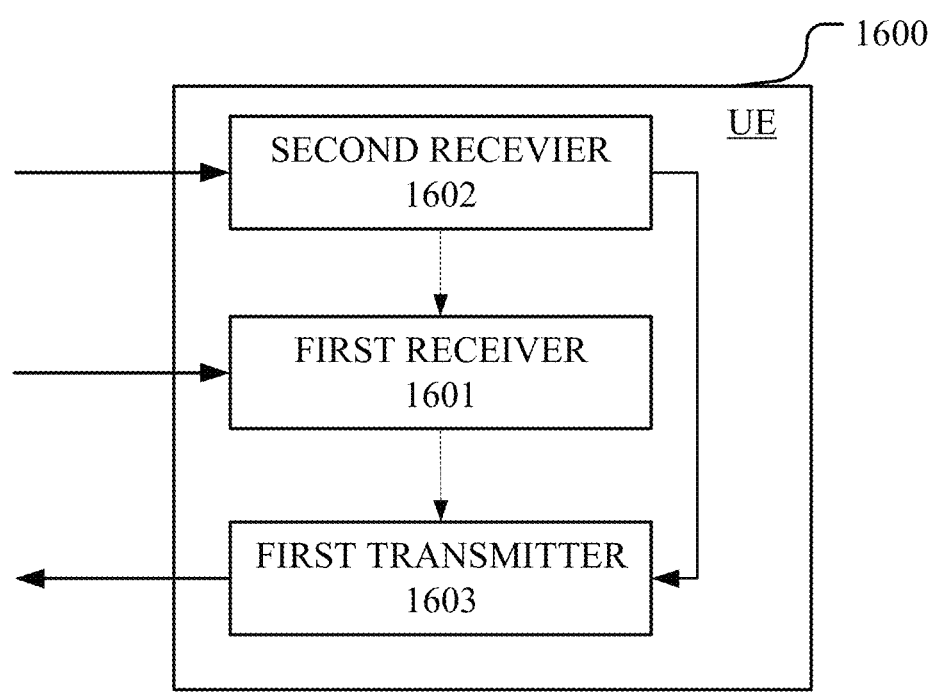
FIG. 16 illustrates a block diagram for a processing device in a user equipment according to one embodiment of the disclosure.

Embodiment XVI illustrates a block diagram for a processing device in a user equipment, as shown in FIG. 16. In FIG. 16, the processing 1600 of the user equipment includes a first receiver 1601, a second receiver 1602 and a first transmitter 1603.

In Embodiment XVI, the first receiver 1601 receives M first-type reference signals respectively in M first-type air interface resources. The second receiver 1602 receives a first wireless signal. The first transmitter 1603 transmits first report information.

In Embodiment XVI, a first spatial reception parameter is used by the second receiver 1602 for reception of the first wireless signal. Measurement of only M1 first-type reference signal(s) of the M first-type reference signals is used by the first transmitter 1603 to generate the first report information. Selection of the M1 first-type reference signal(s) is associated with the first spatial reception parameter; M is a positive integer greater than 1, and M1 is a positive integer less than M.

In one embodiment, the second receiver 1602 further receives first information, wherein the first information indicates a first antenna port group; a transmitting antenna port of the first wireless signal is associated with the first antenna port group; a transmitting antenna port of each of the M1 first-type reference signal(s) is associated with the first antenna port group; the first antenna port group comprises a positive integer number of antenna port(s)

In one embodiment, the second receiver 1602 further receives a second signaling, wherein the second signaling comprises scheduling information of the first wireless signal.

In one embodiment, the second receiver 1602 further receives a first signaling, wherein the first signaling indicates a first information unit, the first information unit comprises a first field; the first field of the first information unit is used to determine the M first-type air interface resources.

In one embodiment, the first information unit includes a second field. The second field of the first information unit is used to determine the content of the first report information.

In one embodiment, the first information unit includes a third field. The third field of the first information unit indicates that the first report information is associated with M1 first-type air interface resource(s); the M1 first-type air interface resource(s) is(are) first-type air interface resource(s) of the M first-type air interface resources that respectively correspond(s) to the M1 first-type reference signal(s).

In one embodiment, the first information unit includes a fourth field. The fourth field of the first information unit indicates a first index, the first index being used to trigger transmission of the first report information.

In one embodiment, the second receiver 1602 further receives a third signaling, wherein the third signaling is used to trigger transmission of the first report information.

In one embodiment, the first receiver 1601 includes at least one of the antenna 452, the receiver 454, the receiving processor 456, the multi-antenna receiving processor 458, the controller/processor 459, the memory 460, and the data source 467 in Embodiment IV.

In one embodiment, the second receiver 1602 includes at least one of the antenna 452, the receiver 454, the receiving processor 456, the multi-antenna receiving processor 458, the controller/processor 459, the memory 460, and the data source 467 in Embodiment IV.

In one embodiment, the first transmitter 1603 includes at least one of the antenna 452, the transmitter 454, the transmitter processor 468, the multi-antenna transmitter processor 457, the controller/processor 459, the memory 460, and the data source 467 in Embodiment IV.

Embodiment XVII

Figure 17:
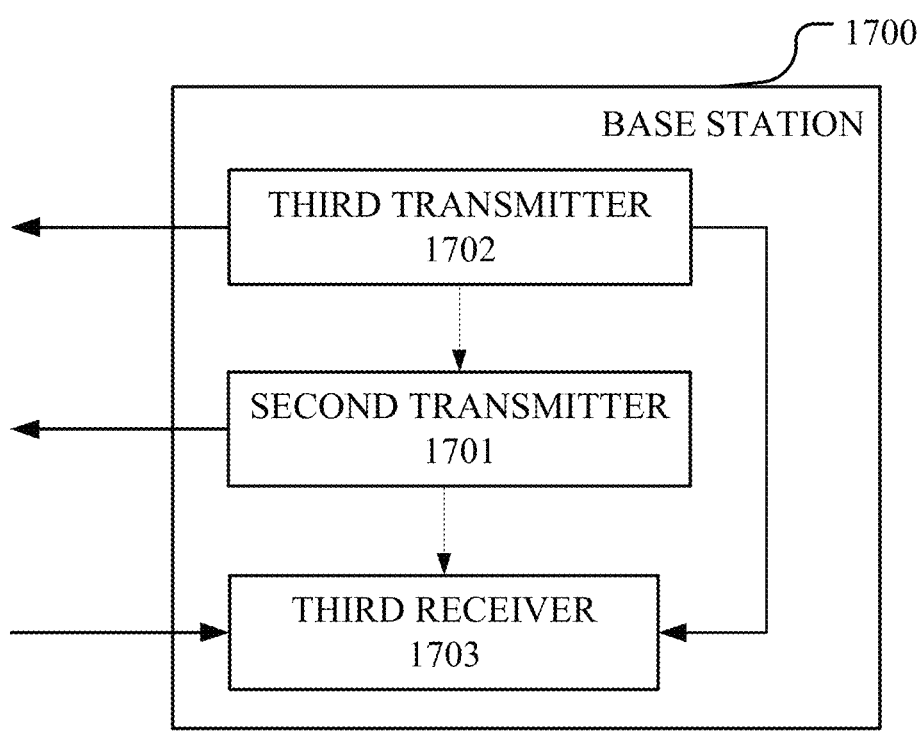
FIG. 17 illustrates a block diagram for a processing device in a base station according to one embodiment of the disclosure.

Embodiment XVII illustrates a block diagram for a processing device in a base station, as shown in FIG. 17. In FIG. 17, the processing device 1700 in the base station includes a second transmitter 1701, a third transmitter 1702, and a third receiver 1703.

In Embodiment XVII, the second transmitter 1701 transmits M first-type reference signals respectively in M first-type air interface resources. The third transmitter 1702 transmits a first wireless signal. The third receiver 1703 receives first report information.

In Embodiment XVII, a first spatial reception parameter is used for reception of the first wireless signal; measurement of only M1 first-type reference signal(s) of the M first-type reference signals is used to generate the first report information; selection of the M1 first-type reference signal(s) is associated with the first spatial reception parameter; M is a positive integer greater than 1, and M1 is a positive integer less than M.

In one embodiment, the third transmitter 1702 further transmits first information, wherein the first information indicates a first antenna port group; a transmitting antenna port of the first wireless signal is associated with the first antenna port group; a transmitting antenna port of each of the M1 first-type reference signal(s) is associated with the first antenna port group; the first antenna port group comprises a positive integer number of antenna port(s).

In one embodiment, the third transmitter 1702 further transmits a second signaling, wherein the second signaling comprises scheduling information of the first wireless signal.

In one embodiment, the third transmitter 1702 further transmits a first signaling, wherein the first signaling indicates a first information unit, the first information unit comprises a first field; the first field of the first information unit is used to determine the M first-type air interface resources.

In one embodiment, the first information unit includes a second field. The second field of the first information unit is used to determine the content of the first report information.

In one embodiment, the first information unit includes a third field. The third field of the first information unit indicates that the first report information is associated with M1 first-type air interface resource(s); the M1 first-type air interface resource(s) is(are) first-type air interface resource(s) of the M first-type air interface resources that respectively correspond(s) to the M1 first-type reference signal(s).

In one embodiment, the first information unit includes a fourth field. The fourth field of the first information unit indicates a first index, the first index being used to trigger transmission of the first report information.

In one embodiment, the third transmitter 1702 further transmit a third signaling, wherein the third signaling is used to trigger transmission of the first report information.

In one embodiment, the second transmitter 1701 includes at least one of the antenna 420, the transmitter 418, the transmitting processor 416, the multi-antenna transmitting processor 471, the controller/processor 475, and the memory 476 in Embodiment IV.

In one embodiment, the third transmitter 1702 includes at least one of the antenna 420, the transmitter 418, the transmitting processor 416, the multi-antenna transmitting processor 471, the controller/processor 475, and the memory 476 in Embodiment IV.

In one embodiment, the third receiver 1703 includes at least one of the antenna 420, the receiver 418, the receiving processor 416, the multi-antenna receiving processor 472, the controller/processor 475, and the memory 476 in Embodiment IV.

The ordinary skill in the art may understand that all or part steps in the above method may be implemented by instructing related hardware through a program. The program may be stored in a computer readable storage medium, for example Read-Only Memory (ROM), hard disk or compact disc, etc. Optionally, all or part steps in the above embodiments also may be implemented by one or more integrated circuits. Correspondingly, each module unit in the above embodiment may be realized in the form of hardware, or in the form of software function modules. The disclosure is not limited to any combination of hardware and software in specific forms. The UE or terminal in the disclosure includes but not limited to uncrewed vehicles, communication modules on uncrewed vehicles, remote control aircrafts, aircrafts, small aircrafts, mobile phones, tablets, notebooks, vehicle communication equipments, wireless sensors, network cards, IoT terminals, RFID terminals, NB-IOT terminals, MTC (Machine Type Communication, machine type communication) terminals, eMTC (enhanced MTC) terminals, data cards, network cards, vehicle communication devices, low-cost mobile phones, low-cost tablet computers and other wireless communication devices. The base station or network side equipment in the disclosure includes but not limited to macro-cellular base stations, micro-cellular base stations, home base stations, relay base stations, gNB (NR node B), TRP (Transmitter Receiver Point), and other radio communication equipment.

Although the present disclosure is illustrated and described with reference to specific embodiments, those skilled in the art will understand that many variations and modifications are readily attainable without departing from the spirit and scope thereof as defined by the appended claims and their legal equivalents.

What is claimed is:

1. A method for wireless communication of a user equipment, comprising:
   receiving a first signaling;
   receiving M first-type reference signals respectively in M first-type air interface resources;
   receiving a first wireless signal; and
   transmitting first report information;
   wherein a first spatial reception parameter is used for reception of the first wireless signal; measurement of only M1 first-type reference signal(s) of the M first-type reference signals is used to generate the first report information; the first spatial reception parameter is used to determine the M1 first-type reference signal(s) from the M first-type reference signals; M is a positive integer greater than 1, and M1 is a positive integer less than M; a target report configuration indicates the content of the first report information; the first signaling indicates a first information unit, the first information unit comprises a first field and a third field; the first field of the first information unit is used to determine the M first-type air interface resources, and the third field of the first information unit indicates that the target report configuration and the M first-type air interface resources are associated.

2. The method according to claim 1, comprising receiving first information, wherein the first information indicates a first antenna port group; a transmitting antenna port of the first wireless signal is associated with the first antenna port group; a transmitting antenna port of each of the M1 first-type reference signal(s) is associated with the first antenna port group; the first antenna port group comprises a positive integer number of antenna port(s); or
   receiving a second signaling, wherein the second signaling comprises scheduling information of the first wireless signal.

3. The method according to claim 1, wherein the third field of the first information unit indicates that the measurement of reference signals transmitted in a part or all of the M first-type air interface resources is used to generate report information corresponding to the target repot configuration; or the first information unit comprises partial or all of the fields in the CSI-MeasConfg IE.

4. The method according to claim 1, comprising receiving a third signaling, wherein the third signaling is used to trigger transmission of the first report information.

5. A method for wireless communication of a base station, comprising:
   transmitting a first signaling;
   transmitting M first-type reference signals respectively in M first-type air interface resources;
   transmitting a first wireless signal; and
   receiving first report information;
   wherein a first spatial reception parameter is used for reception of the first wireless signal; measurement of only M1 first-type reference signal(s) of the M first-type reference signals is used to generate the first report information; the first spatial reception parameter is used to determine the M1 first-type reference signal(s) from the M first-type reference signals; M is a positive integer greater than 1, and M1 is a positive integer less than M; a target report configuration indicates the content of the first report information; the first signaling indicates a first information unit, the first information unit comprises a first field and a third field; the first field of the first information unit is used to determine the M first-type air interface resources, and the third field of the first information unit indicates that the target report configuration and the M first-type air interface resources are associated.

6. The method according to claim 5, comprising transmitting first information, wherein the first information indicates a first antenna port group; a transmitting antenna port of the first wireless signal is associated with the first antenna port group; a transmitting antenna port of each of the M1 first-type reference signal(s) is associated with the first antenna port group; the first antenna port group comprises a positive integer number of antenna port(s); or
   transmitting a second signaling, wherein the second signaling comprises scheduling information of the first wireless signal.

7. The method according to claim 5, wherein the third field of the first information unit indicates that the measurement of reference signals transmitted in a part or all of the M first-type air interface resources is used to generate report information corresponding to the target repot configuration; or the first information unit comprises partial or all of the fields in the CSI-MeasConfg IE.

8. The method according to claim 5, comprising transmitting a third signaling, wherein the third signaling is used to trigger transmission of the first report information.

9. A user equipment for wireless communication, comprising:

a first receiver, receiving M first-type reference signals respectively in M first-type air interface resources;

a second receiver, receiving a first signaling and a first wireless signal; and a first transmitter, transmitting first report information;

wherein a first spatial reception parameter is used for reception of the first wireless signal; measurement of only M1 first-type reference signal(s) of the M first-type reference signals is used to generate the first report information; the first spatial reception parameter is used to determine the M1 first-type reference signal(s) from the M first-type reference signals; M is a positive integer greater than 1, and M1 is a positive integer less than M; a target report configuration indicates the content of the first report information; the first signaling indicates a first information unit, the first information unit comprises a first field and a third field; the first field of the first information unit is used to determine the M first-type air interface resources, and the third field of the first information unit indicates that the target report configuration and the M first-type air interface resources are associated.

10. The user equipment according to claim 9, wherein the second receiver receives first information, wherein the first information indicates a first antenna port group; a transmitting antenna port of the first wireless signal is associated with the first antenna port group; a transmitting antenna port of each of the M1 first-type reference signal(s) is associated with the first antenna port group; the first antenna port group comprises a positive integer number of antenna port(s).

11. The user equipment according to claim 9, wherein the second receiver receives a second signaling; the second signaling comprises scheduling information of the first wireless signal.

12. The user equipment according to claim 9, wherein the third field of the first information unit indicates that the measurement of reference signals transmitted in a part or all of the M first-type air interface resources is used to generate report information corresponding to the target repot configuration.

13. The user equipment according to claim 9, wherein the first information unit comprises a second field; the second field of the first information unit is used to determine a content of the first report information.

14. The user equipment according to claim 9, wherein the the first information unit comprises partial or all of the fields in the CSI-MeasConfg IE.

15. The user equipment according to claim 9, wherein the first information unit comprises a fourth field; wherein the fourth field of the first information unit indicates a first index, the first index being used to trigger transmission of the first report information.

16. The user equipment according to claim 9, wherein the second receiver receives a third signaling; the third signaling is used to trigger transmission of the first report information.

17. A base station for wireless communication, comprising:

a second transmitter transmitting M first-type reference signals respectively in M first-type air interface resources;

a third transmitter transmitting a first signaling and a first wireless signal; and a third receiver receiving first report information;

wherein a first spatial reception parameter is used for reception of the first wireless signal; measurement of only M1 first-type reference signal(s) of the M first-type reference signals is used to generate the first report information; the first spatial reception parameter is used to determine the M1 first-type reference signal(s) from the M first-type reference signals; M is a positive integer greater than 1, and M1 is a positive integer less than M; a target report configuration indicates the content of the first report information; the first signaling indicates a first information unit, the first information unit comprises a first field and a third field; the first field of the first information unit is used to determine the M first-type air interface resources, and the third field of the first information unit indicates that the target report configuration and the M first-type air interface resources are associated.

18. The base station according to claim 17, wherein the third transmitter transmits first information, wherein the first information indicates a first antenna port group; a transmitting antenna port of the first wireless signal is associated with the first antenna port group; a transmitting antenna port of each of the M1 first-type reference signal(s) is associated with the first antenna port group; the first antenna port group comprises a positive integer number of antenna port(s); or the third transmitter transmits a second signaling, wherein the second signaling comprises scheduling information of the first wireless signal.

19. The base station according to claim 17, wherein the third field of the first information unit indicates that the measurement of reference signals transmitted in a part or all of the M first-type air interface resources is used to generate report information corresponding to the target repot configuration; or the first information unit comprises partial or all of the fields in the CSI-MeasConfg IE.

20. The base station according to claim 17, wherein the third transmitter transmits a third signaling, wherein the third signaling is used to trigger transmission of the first report information.

* * * * *